(12) United States Patent
Yoshida

(10) Patent No.: US 6,185,006 B1
(45) Date of Patent: Feb. 6, 2001

(54) ERROR-DISTRIBUTING IMAGE CONVERSION METHOD

(75) Inventor: Yasunari Yoshida, Ama-gun (JP)

(73) Assignee: Brother Kogyo Kabushiki Kaisha, Nagoya ( * ) Notice: Under 35 U.S.C. 154(b), the term of this patent shall be extended for 0 days.

(21) Appl. No.: 09/129,607

(22) Filed: Aug. 5, 1998

(30) Foreign Application Priority Data

Aug. 7, 1997 (JP) .................................................. 9-213502

(51) Int. Cl.[7] .................................................. H04N 1/405
(52) U.S. Cl. .......................... 358/1.9; 358/458; 382/252
(58) Field of Search .......................... 358/1.9, 456, 458, 358/466, 298; 382/252, 237, 270

(56) References Cited

U.S. PATENT DOCUMENTS

| | | | |
|---|---|---|---|
| 5,577,136 | * 11/1996 | Tanioka et al. | 382/252 |
| 5,737,453 | * 4/1998 | Ostromoukhov | 382/252 |
| 5,911,009 | * 6/1999 | Ikuta | 382/252 |

OTHER PUBLICATIONS

Fawcett, G.S. et al, "Halftoning Techniques using Error Correction", Proceedings of the S.I.D., vol. 27, No. 4, (1986), pp. 305–308. (Abstract Only).*

* cited by examiner

Primary Examiner—Scott Rogers
(74) Attorney, Agent, or Firm—Oliff & Berridge, PLC

(57) ABSTRACT

Minimum density pixels are always turned OFF. Maximum density pixels are always turned ON. The binary conversion errors obtained along the main scanning direction based on the maximum and minimum density pixels are subjected to modification processes with using the correction value "a". Thus, binary conversion errors are gradually converted into the non-uniform value pattern IE[pos]. Accordingly, uniform conversion errors will not be distributed to pixels along each main scanning line. The leading edge S of the middle density region will not receive uniform conversion errors. Turned-On pixels will be generated properly non-uniformly, thereby preventing occurrence of any undesirable textures.

44 Claims, 12 Drawing Sheets

ERROR-DISTRIBUTING IMAGE CONVERSION METHOD

BACKGROUND OF THE INVENTION

1. Field of the Invention

The present invention relates to a method of converting continuous tone images into pseudo-halftone binary images.

2. Description of Related Art

An error-distributing image conversion method has been proposed to convert a continuous tone image into a pseudo-halftone image with high quality. The continuous tone image is comprised of a plurality of pixels, each pixel having a density defined by one of plural tone levels. The plural tone levels are defined in a density range between a predetermined minimum density and a predetermined maximum density. The error-distributing image conversion method converts this multilevel density value, at each pixel, into one of two levels, ON and OFF, for example. The plurality of pixels, each thus having a density value of either ON or OFF, construct the pseudo-halftone image.

SUMMARY OF THE INVENTION

In one conceivable process of the error-distributing image conversion method, when converting the multilevel density value of one pixel into a bilevel density value, the multilevel density value may be first modified by binary conversion errors distributed from already-processed pixels that are located in a neighborhood of the subject pixel. Then, the modified multilevel density is compared with a predetermined threshold value. In accordance with the compared result, the subject pixel is turned ON or OFF. Then, a binary conversion error is calculated as a difference between the modified multilevel density and a density represented by the determined bilevel value of ON or OFF. That is, when the subject pixel is turned ON, the conversion error is calculated through subtracting the maximum density from the modified multilevel density. When the subject pixel is turned OFF, on the other hand, the conversion error is calculated as equal to the modified multilevel density. The binary conversion error will be fractionally distributed or affected onto pixels, which are located neighboring to the subject pixel and which have not yet been processed.

In order to distribute or affect the binary conversion error to the unprocessed neighboring pixels, there have been proposed various methods, such as an error diffusion method and a minimized average error method.

The error diffusion method has been proposed by Robert W. Floyd and Louis Steinberg, in "An Adaptive Algorithm for Spatial Greyscale", Proceeding of the S.I.D. Vol. 17/2 [1976]. According to the error diffusion method, after the subject pixel is converted into a binary value, the generated binary conversion error is fractionally distributed or diffused to neighboring pixels not yet processed. Each fraction of the binary conversion error is accumulated into a conversion error sum to be used for processing a corresponding unprocessed neighboring pixel.

The minimized average error method has been proposed by J. F. Jarvis, C. N. Judice, and W. H. Ninke, in "A Survey of Techniques for the Display of Continuous Tone Pictures on Bilevel Displays", Computer Graphics and Image Processing.5, 13–40(1976). According to the minimized average error method, before processing one pixel, the multilevel density of that pixel is added with a sum of fractions of binary conversion errors, which have been generated at already-processed pixels neighboring to the subject pixel. The thus modified multilevel density is converted into the binary value.

The above-described error-distributing image conversion processes can convert a continuous tone image, whose pixels have multilevel densities, into a pseudo-halftone image, whose pixels have bilevel densities. The pseudo-halftone image can be reproduced by a bilevel printer, which is designed to selectively apply an ink dot or not at each pixel location.

The error-distributing image conversion processes, however, induce the problems described below.

It is now assumed that the conceivable error-distributing image conversion process is performed on a pixel by pixel basis onto a continuous tone image D shown in FIG. 1. All the pixels in the continuous tone image D are processed one by one from left to right along each pixel line, i.e., in a main scanning direction x. The pixel lines are processed from top to bottom along the auxiliary scanning direction y. As the pixels are thus proceeded, binary conversion errors are obtained and distributed to unprocessed neighboring pixels. More specifically, each pixel density value is modified by fractions of errors distributed from already-processed neighboring pixels. The modified density is then compared with a predetermined threshold value. Based on the compared result, the pixel density value is converted into a binary value. A binary conversion error generated through the binary conversion process will be affected to neighboring unprocessed pixels.

As shown in FIG. 1, the continuous tone image D has three regions R1, R2, and R3 which are arranged in this order along the auxiliary scanning direction y. Pixels in regions R1, R2, and R3 are subjected to the error-distributing image conversion process in this order.

It is also assumed that density of each pixel in the continuous tone image D is defined in a multilevel density range between zero (0) and 255. The region R1 is a non-uniform density region. Pixels with two or more different densities are distributed non-uniformly in region R1. Contrarily, regions R2 and R3 are uniform density regions. All the pixels in region R2 have the minimum density in the multilevel density range. That is, all the pixels in region R2 have the same density of zero (0). All the pixels in region R3 have the same density of another value greater than zero (0). In this example, all the pixels in region R3 have the same density of one (1).

When this continuous tone image D is converted into a pseudo-halftone image through the conceivable error-distributing binary conversion process, however, the pseudo-halftone image will suffer from undesirable textures occurring in a leading edge S of the region R3. Pixels in leading edge S will be turned ON at a regular interval. The thus regularly arranged turned-ON pixels create a certain texture to be perceived by human eyes.

The present inventor has investigated this problem as described below.

If almost the entire area of the continuous tone image D has non-uniform densities as in region R1, even if the continuous tone image D has some small area having uniform density of some value, pixels in image D will not be converted into ON and OFF levels at any regular intervals even through the conceivable error-distributing image conversion process. A pseudo-halftone image, obtained through the conceivable process, will suffer from no undesirable textures.

The continuous tone image D of FIG. 1, however, has uniform density region R2 of the minimum density and uniform density region R3 of the density higher than the minimum density. Region R3 is located in a downstream side of minimum density region R2 in the auxiliary scanning direction, in which the error-distributing image conversion process is successively performed. No pixels are turned ON in minimum density region R2 during the conceivable error-distributing image conversion process. Accordingly, binary conversion errors, which have been obtained at the region R1, are simply distributed and transmitted through the pixels in region R2. As the conversion process proceeds in region R2 along the auxiliary scanning direction, binary conversion errors gradually become uniform. Accordingly, those pixels that are located in region R2 away from region R1 will receive uniform amounts of binary conversion errors.

Pixels in pixel rows within leading edge S will also receive uniform amounts of binary conversion errors distributed from the region R2. It is noted that all the pixels in the region R3 have the same density of one (1). Every time a pixel in the leading edge S is converted into the OFF level, a conversion error is calculated as equal to the modified density which has been calculated for the subject pixel. The conversion error is fractionally distributed to pixels located downstream of the subject pixel in the main scanning direction. In other words, each pixel in the leading edge S repeatedly receives almost a fixed amount of a fraction in the conversion error every time a pixel located in the upstream side of the subject pixel is turned OFF. Accordingly, every time a certain number of successive pixels, arranged in the main scanning direction, are converted into OFF levels, a pixel located next to the group of the successive pixels will be turned ON. This is because the density of that pixel is modified by the errors, distributed from the successively turned-OFF pixels, into a value high enough to exceed the threshold.

Thus, according to the above-described conceivable error-distributing image conversion process, pixels in the edge S will be turned ON at a regular interval, thereby creating an undesirable texture. It is noted, however, that as the conversion process further proceeds in region R3 in the auxiliary scanning direction, the values of the conversion errors will change irregularly. This is because each turned-ON pixel distributes, to its downstream side pixels, a conversion error which is calculated through subtracting the maximum density from the density modified for the subject pixel. Accordingly, the texture will become unnoticeable at locations away from the region R2.

A similar phenomenon occurs also when the continuous tone image D is designed so that all the pixels in region R2 have the maximum density (255) in the multilevel density range and so that all the pixels in region R3 have the uniform density of a value lower than 255, for example. 254. When this continuous tone image D is converted into a pseudo-halftone image through the conceivable error-distributing image conversion process, pixels in leading edge S will be turned OFF also at a regular interval, thereby creating undesirable textures.

More specifically, according to the above-described conceivable process, when processing each pixel in maximum density region R2, the modified density is calculated as a sum of the maximum density and errors distributed from already-processed neighboring pixels. The modified value will therefore always become greater than the threshold value. A conversion error, to be distributed to unprocessed pixels, is therefore always calculated through subtracting the maximum density from the modified value. Accordingly, as the conversion process proceeds in the maximum density region R2, the conversion error will become gradually uniform, and the uniform amount of the conversion error will be repeatedly distributed to unprocessed pixels.

Thus, the pseudo-halftone image obtained through the above-described conceivable method based on the continuous tone image D has low quality.

In view of the above-described drawbacks, an object of the present invention is to provide an improved method for converting a continuous tone image into a pseudo-halftone image of high quality while preventing occurrence of undesirable textures in a transition region between a uniform density region having the minimum or maximum density and another uniform density region having a density (middle density) different from the corresponding minimum or maximum density.

In order to attain the above and other objects, the present invention provides a method for converting a continuous tone image into a pseudo-halftone image, the method comprising the steps of: receiving data of a continuous tone image desired to be converted into a pseudo-halftone image, the continuous tone image having a plurality of pixels, each pixel having one density value defined in a range between a predetermined minimum density and a predetermined maximum density; and subjecting all the pixels of the continuous tone image to an error-distributing binary conversion process on a pixel by pixel basis along a main scanning direction, to thereby convert the density values of the pixels into binary values while calculating binary conversion errors and distributing the calculated binary conversion errors to neighboring pixels, while performing at least one of a first converting process and a second converting process, the first converting process being for compulsively converting a minimum density pixel that has the minimum density into a first binary value and adjusting a binary conversion error produced for the minimum density pixel into a non-uniform error value, the second converting process being for compulsively converting a maximum density pixel that has the maximum density into a second binary value and adjusting a binary conversion error produced for the maximum density pixel into another non-uniform error value.

The first converting process may adjust the binary conversion error in correspondence with a numerical value, in a non-uniform numerical value pattern, set for a position of the minimum density pixel along the main scanning direction. The second converting process may adjust the binary conversion error in correspondence with another numerical value, in the non-uniform numerical value pattern, set for a position of the maximum density pixel along the main scanning direction.

The error-distributing binary conversion step may include the steps of: (a) judging whether a pixel to be processed to the error-distributing binary conversion process has the minimum density, the maximum density, or another value different from the minimum density; (b) calculating a modified density for the subject pixel through adding the density of the subject pixel with fractional portions of errors distributed from the already-processed pixels neighboring to the subject pixel; (c) comparing the modified density with a predetermined threshold value when the subject pixel is other than the maximum density or the minimum density, and converting the subject pixel into the we first binary value when the modified density is smaller than the threshold value, and converting the subject pixel into the second binary value when the modified density is equal to or greater than the threshold value; (d) compulsively converting the subject pixel into the first binary value when the subject pixel has the minimum density, and compulsively converting the subject pixel into the second binary value when the subject pixel has the maximum density; (e) calculating the conversion error to be distributed from the subject pixel to pixels neighboring to the subject pixel, the conversion error being calculated as equal to the modified density when the subject pixel is converted into the first binary value, the conversion error being calculated as equal to a value obtained through subtracting the maximum density from the modified density when the subject pixel is converted into the second binary value; (f) modifying the conversion error, when the subject pixel has either the maximum density or the minimum density, in accordance with a numerical value, in the non-uniform numerical value pattern, set for the position of the subject pixel along the main scanning direction; and (g) repeating the steps (a) through (f) for all the pixels within the continuous tone image, thereby producing the pseudo-halftone image.

According to another aspect, the present invention provides a conversion device for converting a continuous tone image into a pseudo-halftone image, the device comprising: means for receiving data of a continuous tone image desired to be converted into a pseudo-halftone image, the continuous tone image having a plurality of pixels, each pixel having one density value defined in a range between a predetermined minimum density and a predetermined maximum density; and means for subjecting all the pixels of the continuous tone image to an error-distributing binary conversion process on a pixel by pixel basis along a main scanning direction, to thereby convert the density values of the pixels into binary values while calculating conversion errors and distributing the calculated conversion errors to neighboring pixels, while performing at least one of a first converting process and a second converting process, the first converting process being for compulsively converting a minimum density pixel that has the minimum density into a first binary value and adjusting a binary conversion error produced for the minimum density pixel into a non-uniform error value, the second converting process being for compulsively converting a maximum density pixel that has the maximum density into a second binary value and adjusting a binary conversion error produced for the maximum density pixel into another non-uniform error value.

The conversion means may include: means for storing a non-uniform numerical value pattern; and means for converting the density values of the pixels into binary values while calculating conversion errors and distributing the calculated conversion errors to neighboring pixels, while performing at least one of the first converting process and the second converting process, the first converting process adjusting the conversion error in correspondence with a numerical value, in the non-uniform numerical value pattern, set for a position of the minimum density pixel along the main scanning direction, and the second converting process adjusting the binary conversion error in correspondence with another numerical value, in the non-uniform numerical value pattern, set for a position of the maximum density pixel along the main scanning direction.

The converting means may include: means for judging whether or not the subject pixel density is equal to the minimum density, the maximum density, or not; means for, when the subject pixel density is equal to either the minimum density or the maximum density, comparing the binary conversion error, produced at the subject pixel, with a numerical value in the non-uniform numerical value pattern at a corresponding position; and means for modifying the binary conversion error in correspondence with the non-uniform numerical value pattern in accordance with the compared result.

According to still another aspect, the present invention provides a program data storage medium for storing data of a program for converting a continuous tone image into a pseudo-halftone image, the program comprising the programs of: receiving data of a continuous tone image desired to be converted into a pseudo-halftone image, the continuous tone image having a plurality of pixels, each pixel having one density value defined in a range between a predetermined minimum density and a predetermined maximum density; and subjecting all the pixels of the continuous tone image to an error-distributing binary conversion process on a pixel by pixel basis along a main scanning direction, to thereby convert the density values of the pixels into binary values while calculating binary conversion errors and distributing the calculated binary conversion errors to neighboring pixels, while performing at least one of a first converting process and a second converting process, the first converting process being for compulsively converting a minimum density pixel that has the minimum density into a first binary value and adjusting a binary conversion error produced for the minimum density pixel into a non-uniform error value, the second converting process being for compulsively converting a maximum density pixel that has the maximum density into a second binary value and adjusting a binary conversion error produced for the maximum density pixel into another non-uniform error value. The data of the program stored in the program data storage medium can be retrieved and executed by a computer system.

DETAILED DESCRIPTION OF THE INVENTION

Figure 1:
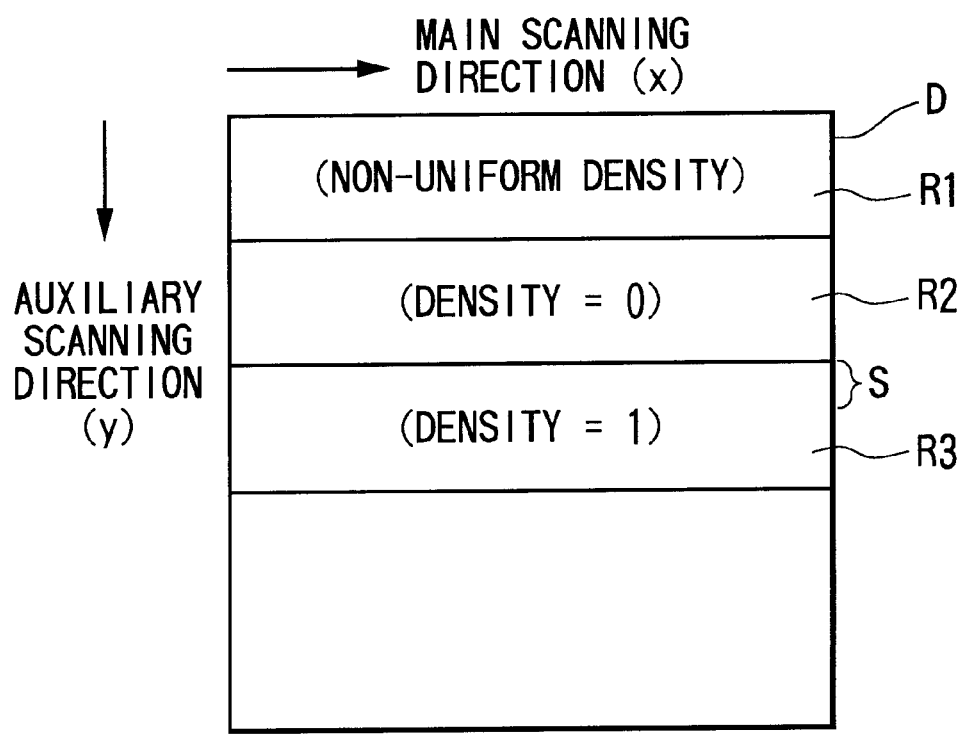
FIG. 1 illustrates a continuous tone image to be converted into a pseudo-halftone image.

A basic structure of the error-distributing image conversion method of the present invention will be first described in greater detail.

According to the image conversion method of the present invention, a continuous tone image is converted into a pseudo-halftone image through subjecting all the pixels of the continuous tone image to an error-distributing binary conversion process on a pixel by pixel basis along a main scanning direction, to thereby convert the density values of the pixels into binary values while calculating conversion errors and distributing the calculated conversion errors to neighboring pixels, while compulsively turning OFF each minimum density pixel and compulsively turning ON each maximum density pixel. A binary conversion error for each minimum density pixel is adjusted so that an error pattern produced by a plurality of minimum density pixels in the main scanning direction x may become a non-uniform error pattern. A binary conversion error for each maximum density pixel is adjusted so that an error pattern produced by a plurality of maximum density pixels in the main scanning direction x may also become a non-uniform error pattern.

For example, a binary conversion error is modified for each minimum density pixel and for each maximum density pixel in accordance with a predetermined non-uniform numerical value pattern so that errors produced by the plurality of minimum density pixels and errors produced by the plurality of maximum density pixels may become non-uniform in the main scanning direction x.

Preferably, the non-uniform numerical value pattern may be designed so as to be capable of converting a uniform density continuous tone image into a pseudo-halftone image with no undesirable textures through the method of the present invention. The uniform density continuous tone image is defined as a continuous tone image whose all the pixels have a single middle density greater than the minimum density and lower than the maximum density.

More preferably, the non-uniform numerical value pattern is designed so as to be capable of converting all the uniform density continuous tone images into pseudo-halftone images with no undesirable textures through the method of the present invention. All the uniform density continuous tone images have densities located between the minimum density and the maximum density. All the pixels in each uniform density continuous tone image have a corresponding single density.

For example, the non-uniform numerical value pattern may be constructed from a binary conversion error pattern, which is produced along the main scanning direction x when one uniform density continuous tone image is converted into a pseudo-halftone image through an error-distributing binary conversion process. More specifically, the non-uniform numerical value pattern may be constructed from a part, of the binary conversion error pattern, which corresponds to a portion in the pseudo-halftone image that suffers from no undesirable textures. It is noted that all the pixels in the uniform density continuous tone image have a single uniform density greater than the minimum density and lower than the maximum density. The density of the uniform density continuous tone image is preferably located in a relatively low density range defined between a value of (minimum density+1) and another value of ((maximum density+1)/4).

Undesirable textures are liable to be generated in a wider area in a low density region than in a higher density region. The number of pixels turned ON in the low density region is smaller than that in the higher density region. When a certain pixel is turned ON, a conversion error is calculated through subtracting the output density of 255 from a density modified for that pixel. Accordingly, when a pixel is turned ON, amounts of errors to be fractionally distributed from the subject pixel to its neighboring pixels greatly change. Thus, every time a pixel is turned ON, a binary conversion error will be fractionally distributed non-uniformly. Because the number of turned-ON pixels is small in the low density region, there is a small possibility that binary conversion errors be distributed non-uniformly over the low density region. Considering this effect, the non-uniform numerical value pattern is preferably produced so as not to occur any undesirable bra textures on the low density region. Accordingly, the non-uniform numerical value pattern is produced through subjecting the uniform density continuous tone image having the low density to the error-distributing conversion process.

Or, the non-uniform numerical value pattern may be constructed from a random numerical value pattern. In the random numerical value pattern, a plurality of random numbers are arranged in the main scanning direction.

The numerical values constituting the non-uniform numerical value pattern are preferably equal to or smaller than a predetermined threshold value which is used during the error-distributing conversion process. With this structure, it is possible to suppress occurring of dots in each single scanning line.

It is now assumed that the error-distributing image conversion method of the present invention is performed onto the continuous tone image D of FIG. 1 where all the pixels in region R2 have the minimum density of zero (0) or the maximum density of 255 and all the pixels in the region R3 have the density of one (1) or 254.

According to the present invention, pixels having the minimum density (0, for example) are compulsively turned OFF. When the region R2 is the minimum density region, all the pixels in region R2 will therefore be turned OFF similarly to the above-described conceivable image conversion process. No pixels in the region R2 will be turned ON.

It Similarly, pixels having the maximum density (255, for example) are compulsively turned ON. When the region R2 is the maximum density region, therefore, all the pixels in region R2 will therefore be turned ON similarly to the conceivable image conversion process. No pixels in the region R2 will be turned OFF.

Additionally, according to the present invention, the binary conversion errors obtained along the main scanning direction due to the maximum or minimum density pixels are adjusted into a non-uniform error pattern. Accordingly, the binary conversion errors will not be generated uniformly along the main scanning direction. Even when the binary conversion process is proceeded in the maximum or minimum density region, binary conversion errors will not be uniformly distributed to not-yet processed pixels.

Thus, even when the conversion process proceeds in minimum or maximum density region R2, conversion errors with uniform values will not be distributed to unprocessed pixels. Pixels in leading edge S will not receive conversion errors with uniform values. Pixels in leading edge S will be turned ON or OFF irregularly, thereby preventing occurrence of the undesirable texture.

The binary conversion errors obtained along the main scanning direction x may be gradually adjusted into a non-uniform error pattern. Because the binary conversion errors become gradually uniform during the successively-performed binary conversion processes, even when the conversion errors are gradually adjusted into the non-uniform pattern, leading edge S of region R3 will not suffer from any undesirable textures.

For example, binary conversion errors, obtained at pixels successively arranged along the main scanning direction, may be gradually changed to approach the predetermined non-uniform numerical value pattern.

In order to gradually change the binary conversion errors to approach the predetermined non-uniform numerical value pattern, it is preferable to successively perform comparing operation onto binary conversion errors obtained at successively-arranged pixels. In each of the successively-performed comparing processes, the binary conversion error is compared with a numerical value in the predetermined non-uniform numerical value pattern at a corresponding position. The amount of the binary conversion error is increased when the binary conversion error is smaller than the corresponding numerical value. The amount of the binary conversion error is decreased when the binary conversion error is larger than the corresponding numerical value.

For example, the binary conversion error is increased through adding a predetermined correction value to the binary conversion error. The binary conversion error is decreased through subtracting the predetermined correction value from the binary conversion error. The predetermined correction value preferably has a value in a range of 2% to 25% of the maximum density.

In another example, the binary conversion error may be changed through multiplying or dividing the binary conversion error with another correction value. For example, the binary conversion error may be increased through multiplying the binary conversion error by one correction value, and may be decreased through dividing the binary conversion error with the same correction value. Or, the binary conversion error may be decreased through multiplying the binary conversion error by another one correction value, and may be increased through dividing the binary conversion error with the same correction value.

The correction value used in the above-described error increasing and decreasing processes (adding, subtracting, multiplying and dividing processes) can be determined based on a difference between the binary conversion error pattern and the non-uniform numerical value pattern.

In order to properly convert any input continuous tone image into a pseudo-halftone image while not changing the brightness (density) or the like of the input continuous tone image, the binary conversion error pattern may preferably be changed into the non-uniform numerical value pattern while maintaining an average value or a total value of the binary conversion error pattern.

For example, the binary conversion error pattern may be changed into the non-uniform numerical value pattern while maintaining the average value or the total value of the binary conversion error pattern through controlling the number of pixels, at which the increasing process is attained, to be equal to the number of pixels, at which the decreasing process is attained.

A method according to preferred embodiments of the present invention will be described below in greater detail while referring to the accompanying drawings.

[First Embodiment]

A first embodiment will be described below with reference to FIGS. 2 through 6. The error-distributing image conversion process employed in the first embodiment is of the error diffusion type for distributing an error, generated when each pixel is processed, to neighboring pixels not yet processed.

Figure 2:
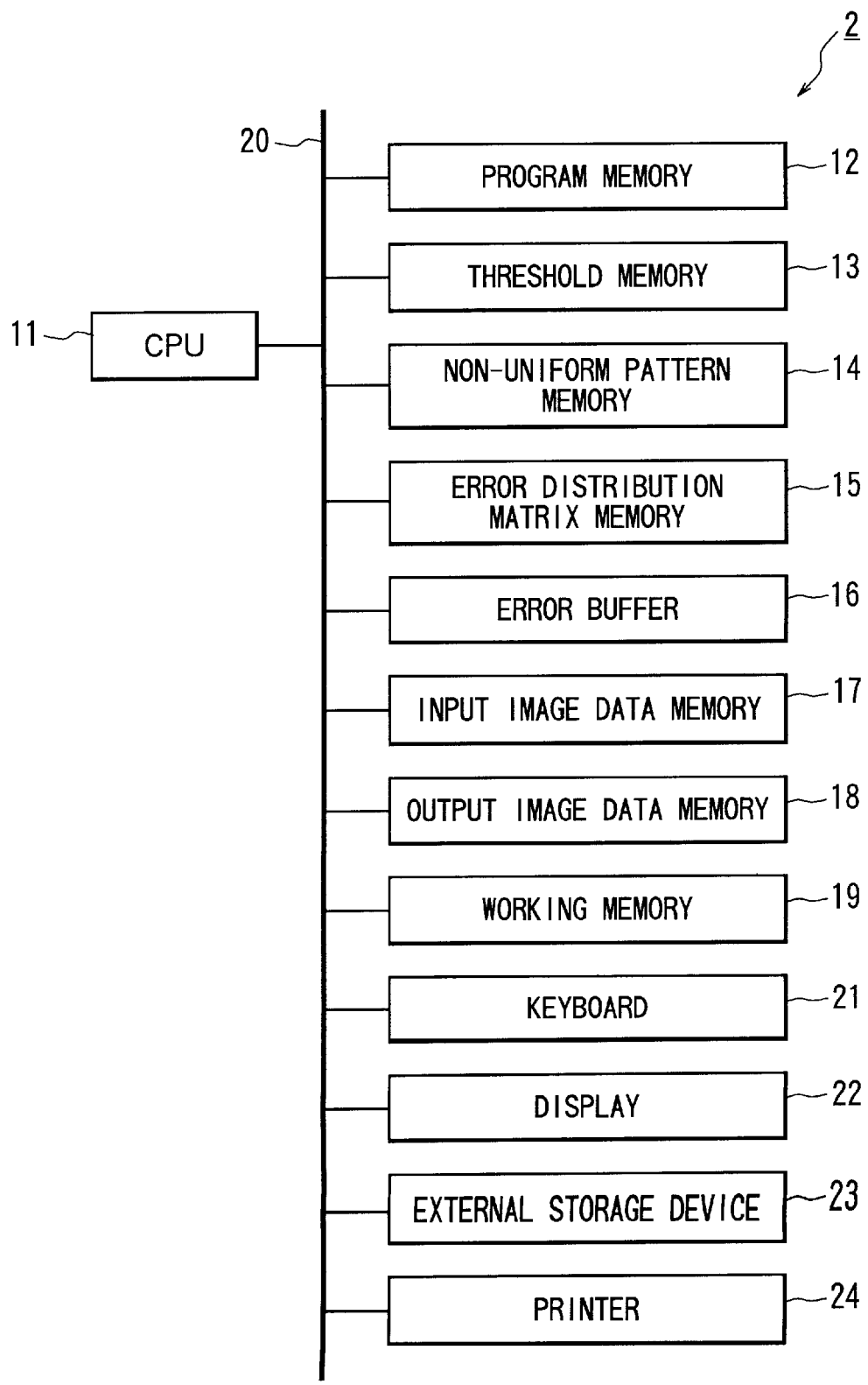
FIG. 2 is a block diagram of an image conversion device of a first embodiment of the present invention.

FIG. 2 is a block diagram of a continuous tone image data conversion device 2 for performing the error diffusion image conversion process of the present embodiment. The device 2 is for converting input continuous tone images with 256 tone levels into binary pseudo-halftone output images through the error diffusion image conversion method of the present embodiment.

A main part of the image conversion device 2 is constructed from a microcomputer. The microcomputer includes: a CPU 11; a program memory 12 constructed from a ROM; a threshold storage portion 13 prepared in a RAM; a non-uniform numerical value pattern storage memory 14 prepared in the RAM; an error distribution matrix memory 15 also prepared in the RAM; an error buffer 16 also prepared in the RAM; an input image memory 17 also prepared in the RAM; an output image memory 18 also prepared in the RAM; and a working memory 19 also prepared in the RAM. The respective elements 11 through 19 are connected to one another via a system bus line 20 to exchange control signals and data signals therebetween.

The image conversion device 2 is further provided with: input/output elements, such as a keyboard 21 and a display 22, which are required for the device 2 to perform a computing operation; an external storage device 23 such as a hard disk drive and a floppy disk drive; and a printer 24. These elements 21 through 24 are also connected to the elements 11–19 via the bus 20.

Figure 5:
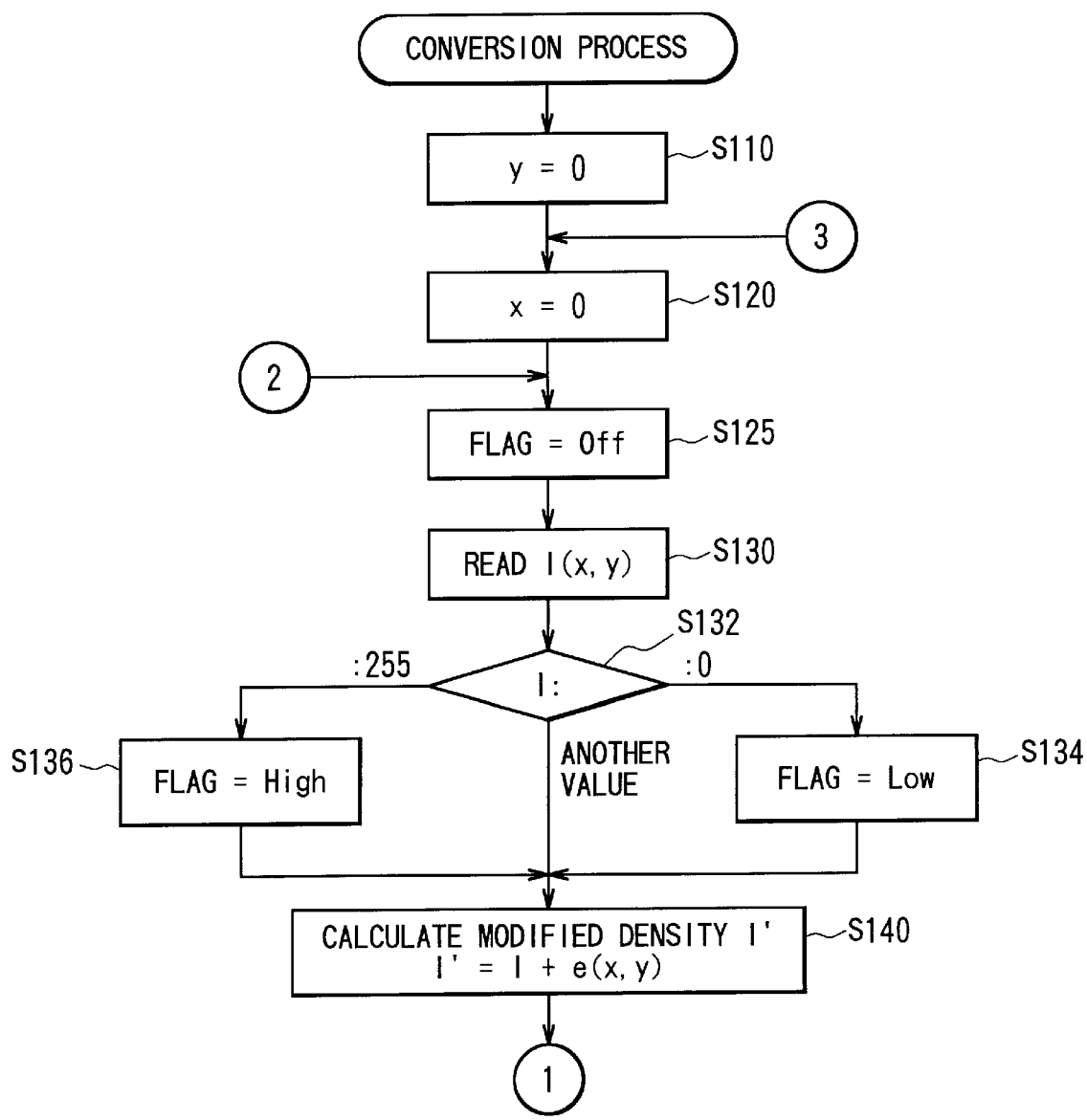
FIG. 5 is a part of a flow chart of the error diffusion type image conversion process of the first embodiment employed by the image conversion device of FIG. 2.
Figure 6:
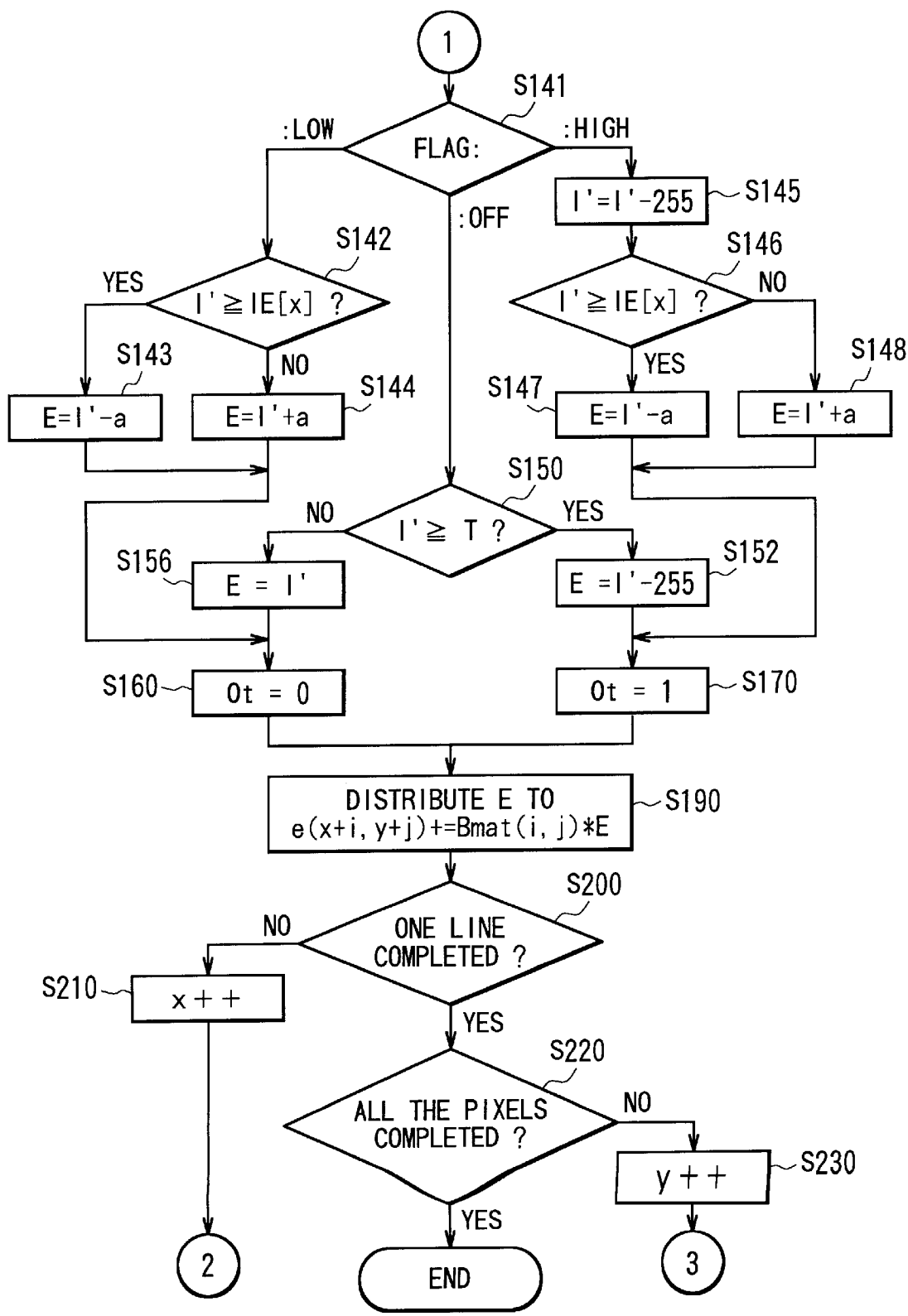
FIG. 6 is a remaining part of the flow chart of the error diffusion type image conversion process of the first embodiment.

The program storage portion 12 stores therein: a basic program required for the device 2 to perform a computing operation; a program of an error diffusion image conversion process as shown in FIGS. 5 and 6 for converting continuous tone images into pseudo-halftone binary images; and other various processing programs. The program storage portion 12 may further store a program shown in FIG. 3 for producing a non-uniform numerical value pattern to be stored in the memory 14. Each program is executed by the CPU 12 when required. It is noted that data of those programs may be previously stored in a floppy disk, a magnetooptical disk, a CD-ROM or the like. When required, data of the programs is retrieved from these data storage media by the operation of the external storage device 23 and is written into the working memory 19.

The threshold storage portion 13 stores therein a predetermined threshold value T to be used during the error-distributing image converting process. The threshold value T is equal to 128, for example.

Figure 4:
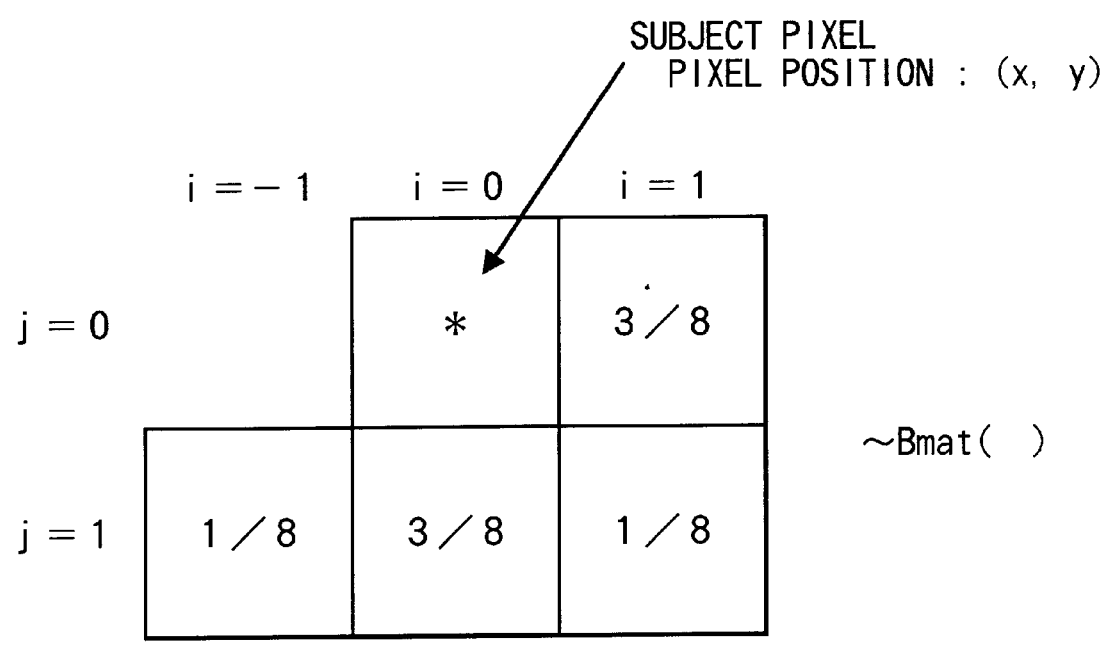
FIG. 4 illustrates one example of an error distribution matrix employed in the non-uniform numerical value pattern production process and in an error-diffusion image conversion process of the first embodiment.

The error distribution matrix storage portion 15 previously stores therein an error diffusion matrix Bmat() shown in FIG. 4. As shown in that figure, the error distribution matrix Bmat() indicates: unprocessed four neighboring pixels, to which a binarization error E(x, y), occurred at one pixel (x, y) during the error diffusion image conversion process to be described later, is fractionally distributed; and distribution rates at which the error E(x, y) is fractionally distributed to the unprocessed four neighboring pixels.

The error buffer 16 is for storing an accumulation e(x, y) of conversion errors distributed to each pixel (x, y) from its neighboring already-processed pixels. The input image data storage portion 17 is for storing data of a continuous tone image inputted from the external storage device 23 or the like as desired to be converted into a pseudo-halftone image. The input image data I (x, y) representative of density of each pixel (x, y) in the continuous tone image has a multilevel value in a range of zero (0) to 255. The output image data storage portion 18 is for storing pseudo-halftone image data Ot (x, y) which is obtained when the continuous tone image data I (x, y) in the storage portion 17 is subjected to the error diffusion image conversion process. The pseudo-halftone image data Ot(x, y) has a binary value of either ON (1) or OFF (0). When required, the thus obtained pseudo-halftone image data is displayed on the display 22 or is recorded by the printer 24.

The numerical value pattern memory 14 stores therein a non-uniform numerical value pattern IE[pos]. The non-uniform numerical value pattern IE[pos] includes a plurality of non-uniform numerical values arranged in line in a main scanning direction x, where "pos" indicate an x-coordinate.

As will be described later, during the error-diffusion image conversion process of the present embodiment, binary conversion errors, obtained for pixels of the maximum density (255, in this example) and pixels of the minimum density (0, in this example), are modified according to the non-uniform pattern IE[pos] so that the conversion errors will become non-uniform in the main scanning direction.

The non-uniform pattern IE[pos] is previously produced in a manner described below.

First, a uniform density continuous tone image is prepared. In the uniform density continuous tone image, a plurality of pixels are arranged both in the main scanning direction x and an auxiliary scanning direction y perpendicular to the main scanning direction x. The uniform density continuous tone image has a sufficiently large size relative to the size of the pattern IE[pos] desired to be obtained. All the pixels in the uniform density continuous tone image have the same density defined between a density of (minimum density+1) and another density of ((maximum density+1)/4). In this example, all the pixels in the uniform density continuous tone image have the same single density located in the range of 1 to 64 because the minimum density is equal to zero (0) and the maximum density is equal to 255. The uniform density continuous tone image is then converted into a binary image through an error diffusion conversion process. The error diffusion conversion process is successively performed onto pixels in the uniform density continuous tone image at least until pixels are turned ON and OFF stably and uniformly along the main scanning direction. Binary conversion errors, aligned at a certain pixel line (main scanning line) where turned-ON and turned-OFF pixels are arranged stably and uniformly, are set as the pattern IE[pos] where [pos] indicates the positions of the pixels along the main scanning direction x.

One example of the process for producing the non-uniform pattern IE[pos] will be described below in greater detail with reference to FIG. 3.

According to this process, the pattern IE[pos] is produced by the conversion device 2 before the conversion device 2 is shipped from a factory. Accordingly, the threshold T stored in the memory 13, the error distributing matrix Bmat() stored in the memory 15, the error buffer 16, and the output image memory 18 are used also in this process.

When the process is started, variables x and y are initialized to zero (0) in S1 and S3. The variables x and y are for defining a subject pixel position (x, y) of the uniform density continuous tone image, whose density I(x, y) is to be converted into a binary value. It is noted that a main scanning direction x is defined along each pixel line, and an auxiliary scanning direction y is defined perpendicular to the main scanning direction x.

Ig Next, density I(x,y) for each pixel (x, y) of the uniform density continuous tone image is set to ten (10) ($1 \leq 10 \leq 64$) in S5. Then, in S7, an error sum e(x, y) is retrieved from a corresponding memory location (x, y) in the buffer memory 16. The error sum e(x, y) is an accumulated amount of error fractions distributed from already-processed pixels neighboring to the subject pixel (x, y). The present density value I(x, y) of ten (10) is then modified by the error sum e(x, y). That is, the present density value I(x, y) is modified into a modified density I'(x, y) through the following formula:

$$I'(x, y) = I(x, y) + e(x, y)$$

Then, the program proceeds to S9 where the modified density I'(x, y) is compared with the threshold value T read from the threshold memory 13. In this example, the threshold T has a value of 128.

If I'(x, y)$\geq$T ("Yes" in S9), a binary conversion error E(x, y) is calculated in S15 for the subject pixel (x, y) in the following formula:

$$E(x, y) = I'(x, y) - 255$$

Then, in S17, the subject pixel density is converted into an output density value Ot(x,y) of one (1=ON).

On the other hand, if I'(x, y)<T ("No" in S9), the binary conversion error E(x, y) is calculated in S11 for the subject pixel (x, y) in the following formula:

$$E(x, y) = I'(x, y)$$

Then, in S13, the subject pixel density is converted into an output density value Ot(x,y) of zero (0=OFF).

The output density value Ot(x, y) thus obtained in S17 or S13 is stored in the output image data memory 18 as binary data for the subject pixel (x, y).

After performing the process of S13 or S17, the program proceeds to S19, where the binary conversion error E(x, y) produced at the subject pixel (x, y) in either one of the above-described processes of S11 and S15 is distributed to the error buffer 16 at a location (x+i, y+j) for each of neighboring four pixels not yet processed. The binary conversion error E(x, y) is fractionally distributed to the neighboring four pixels in a weighted basis defined by the predetermined error diffusion matrix Bmat() through the following formula:

$$e(x+i, y+j) += \text{Bmat}(i, j) \times E(x, y)$$

wherein += is an operator for calculating a sum of a value already stored in the error buffer (x+i, y+j) and a fraction of the error E(x, y) that is distributed to the corresponding pixel (x+i, y+j) from the subject pixel (x, y). A representative example of the matrix Bmat () is shown in FIG. 4.

In the matrix Bmat(), * indicates a subject pixel position (x, y), and each value in the matrix indicates a coefficient to be multiplied with the error E(x, y) before being distributed from the subject pixel (x, y) to a neighboring pixel (x+i, y+j), which is located relative to the subject pixel (x, y) as shown in the matrix. Thus distributed error fractional portion is accumulated in a corresponding memory location (x+i, y+j) in the error buffer 16 according to the above-described formula. For example, the next pixel (x+1, y) on the same pixel line receives a $\frac{3}{8}^{th}$ part of the error E(x, y). The $\frac{3}{8}^{th}$ part of the error E(x, y) is therefore accumulated in the corresponding memory location (x+1, y) of the error buffer 16.

Next, in S21, it is judged whether or not all the pixels in the present pixel line along the main scanning direction x have been processed. When any pixels remain unprocessed ("no" in S21), a pixel position is shifted to the next pixel position (x+1, y) in S23, and the process returns to S5. Then, the process from S5 is repeated.

When all the pixels have been processed in the subject pixel line ("yes" in S21), on the other hand, it is further judged in S25 whether or not all the pixels in the uniform density continuous tone image have been processed. When any pixels remain unprocessed ("no" in S25), the pixel position is shifted to the next pixel line in the auxiliary scanning direction y in S27. Then, the process returns to S3. Then, the process from S3 is repeated.

Thus, all the pixels (x, y) in the uniform density continuous tone image are subjected to the error-diffusion image conversion process on a pixel by pixel basis. That is, the densities I(x, y) of ten (10) of all the pixels are successively converted into bilevel values Ot(x, y), and are stored in the memory 18. All the pixels receive an accumulation e(x, y) of binary conversion errors diffused from their already-processed neighboring pixels. The accumulated error sums are stored in the memory 16.

When all the pixels have been processed ("yes" in S25), a pseudo-halftone binary image is completely produced by the bilevel values Ot(x, y) stored for all the pixels (x, y) in the output image data memory 18.

Then, in S29, the non-uniform pattern IE[pos] is produced. The production process of S29 will be described below in detail.

In this process of S29, the display 22 or the printer 24 is first controlled based on the bilevel values Ot(x, y) to show the pseudo-halftone binary image. While visually observing the pseudo-halftone binary image, an operator selects one line-shaped region where the bilevel values Ot(x, y) are arranged at a stable and uniform condition along the main scanning direction x. The stable region is designed to have: no undesirable textures where turned-ON pixels or turned-OFF pixels are periodically arranged; no voids where turned-ON pixels are dispersed too thinly; and no clusters where turned-ON pixels are grouped too tightly.

Then, binary conversion error sums e(x, y) are retrieved from the error buffer 16 for those pixels (x, y) that are located in the selected stable region. The thus retrieved binary conversion error sums e(x, y) are arranged in a table and are stored in the memory 14 as the non-uniform pattern IE[pos]. Then, the contents of the error buffer 16 and the output image memory 18 are cleared so as to be prepared for being used in the conversion process of FIGS. 5–6 to be described later. Then, the non-uniform pattern production process of FIG. 3 ends.

The uniform density continuous tone image I, based on which the pattern IE[pos] is produced as described above, has the single low uniform density of ten (10) which is higher than the minimum density (0) and lower than the maximum density (255). The pseudo-halftone image Ot is obtained based on this uniform low density image I, and therefore is liable to have undesirable periodic patterns which can be easily perceived by human eyes. It is therefore possible for the operator to easily Judge which part of the pseudo-halftone image Ot has uniformly- and stably-distributed turned-ON and turned-OFF pixels.

With using the above-described non-uniform value pattern IE[pos] stored in the memory 14, the device 2 of the present embodiment can convert any inputted continuous tone images into pseudo-halftone images through the error diffusion image conversion process of FIGS. 5 and 6.

The error diffusion image conversion process is executed by the CPU 11 as described below.

This error diffusion image conversion process is designed to convert a multilevel continuous tone input image, stored in the input image data memory 17, into a binary pseudo-halftone image. In the multilevel continuous tone input image, a plurality of pixels are arranged both in the main scanning direction x and in the auxiliary scanning direction y. The binary pseudo-halftone image is produced to have the plurality of pixels arranged both in the main scanning direction x and in the auxiliary scanning direction y.

It is noted that the length of the continuous tone input image, along the main scanning direction x, is equal to the length of the pattern IE[pos] along the main scanning direction x. However, the length of the continuous tone input image may not be equal to the length of the pattern IE[pos]. When the continuous tone image is shorter than the pattern IE[pos], only a part of the pattern IE[pos] is used for the continuous tone image. When the continuous tone image is longer than the pattern IE[pos], the pattern IE[pos] will be repeatedly used over the continuous tone image along the main scanning direction. It is preferable that the pattern IE[pos] of such a small size be stored in the memory 14.

When the conversion process of FIGS. 5 and 6 is started, variables x and y are initialized to zero (0) in S110 and S120. The variables x and y are for defining a subject pixel position (x, y) of the input continuous tone image, whose density I(x, y) is to be converted into a binary value Ot(x, y). It is noted that each pixel line of the input continuous tone image extends along the main scanning direction x.

Next, a flag FLAG is set to OFF in S125. Then, input density I(x,y) (where $0 \leq I \leq 255$) for the subject pixel (x, y) is retrieved in S130 from the input image data memory 17. It is then judged in S132 whether the input density I(x, y) is a minimum value (0), a maximum value (255), or another value located within the range of 0<I<255.

If I(x, y)=0, the program proceeds to S134 where the flag FLAG is set to Low. Then, the program proceeds to S140. On the other hand, if I(x, y)=255, the program proceeds to S136 where the flag FLAG is set to High. Then, the program proceeds to S140. When it is judged in S132 that 0<I(x, y)<255, the program directly proceeds to S140.

In S140, an error sum e(x, y) is retrieved from a corresponding memory location (x, y) in the buffer memory 16. The error sum e(x, y) is an accumulated amount of error fractions distributed from already-processed pixels neighboring to the subject pixel (x, y). The present density value I(x, y) is then modified by the error sum e(x, y). That is, the present density value I(x, y) is modified into a modified density I'(x, y) through the following formula (1):

$$I'(x, y) = I(x, y) + e(x, y) \tag{1}$$

Then, the program proceeds to S141 shown in FIG. 6. In S141, the present status of the flag FLAG is judged. If flag FLAG=Low, the program proceeds to S142, where the CPU 111 retrieves, from the pattern IE[pos], a value IE[x] corresponding to the subject pixel position (x, y) along the main scanning direction X. Then, the modified density I'(x, y) is compared with the retrieved value IE[x].

If I'(x, y)≧IE[x] ("Yes" in S142), a binary conversion error E(x, y) is calculated in S143 through subtracting a predetermined correction value "a" from the modified density I'(x, y). It is noted that the predetermined correction value "a" is fixed and satisfies the following inequality: a>0. Preferably, the correction value "a" is in a range of a value of 2% of the maximum density and another value of 25% of the maximum density. This is because if the correction value "a" is lower than the value of 2% of the maximum density, the correction value "a" is too small to properly prevent the conversion errors from becoming uniform. If the correction value "a" is greater than the value of 25% of the maximum density, on the other hand, the correction value "a" will largely modify the correction errors E, thereby shifting the density of the image too largely from the original density. Because the maximum density is 255 in this example, the correction value "a" is in a range of 5 to 64. Thus, in S143, the following formula (2) is calculated:

$$E(x, y)=I'(x, y)-a \quad (2)$$

On the other hand, if I'(x, y)<IE[x] ("No" in S142), the binary conversion error E(x, y) is calculated in S144 through adding the predetermined correction value "a" to the modified density I'(x, y). That is, the following formula (3) is calculated:

$$E(x, y)=I'(x, y)+a \quad (3)$$

On the other hand, if the flag FLAG=High in S141, the program proceeds to S145, in which the modified density I'(x, y) is further modified through subtracting the maximum density value of 255 from the modified density I'(x, y). That is, the following formula (4) is calculated.

$$I'(x, y)=I'(x, y)-255 \quad (4)$$

Next, the CPU 111 retrieves, from the pattern IE[pos], the value IE[x] corresponding to the subject pixel position (x, y) along the main scanning direction X. Then, the density I'(x, y) modified in S145 is compared with the retrieved value IE[x].

If I'(x, y)≧IE[x] ("Yes" in S146), a binary conversion error E(x, y) is calculated in S147 through calculating the above-described formula (2), that is, through subtracting the predetermined correction value "a" from the modified density I'(x, y).

On the other hand, if I'(x, y)<IE[x] ("No" in S146), the binary conversion error E(x, y) is calculated in S148 through calculating the formula (3), that is, through adding the predetermined correction value "a" to the modified density I'(x, y).

On the other hand, if the flag FLAG=Off, the program proceeds to S150, where the modified density I'(x, y) is compared with the threshold value T. In this example, the threshold T has the value of 128.

If I'(x, y)≧T ("Yes" in S150), the binary conversion error E(x, y) is calculated in S152 for the subject pixel (x, y) in the following formula (5):

$$E(x, y)=I'(x, y)-255 \quad (5)$$

On the other hand, if I'(x, y)<T ("No" in S150), the binary conversion error E(x, y) is calculated in S156 for the subject pixel (x, y) in the following formula (6):

$$E(x, y)=I'(x, y) \quad (6)$$

After the process of S152, S147, or S148, the program proceeds to S170, where the subject pixel density is converted into an output density value Ot(x,y) of one (1=ON). Thus, the subject pixels is turned ON. With this structure, when the subject pixel (x, y) has the maximum density (255) ("high" in S141), the subject pixel is always turned ON.

After the process of S156, S143, or S144, the program proceeds to S160, where the subject pixel density is converted into an output density value Ot(x,y) of zero (0=OFF). Thus, the subject pixels is turned OFF. With this structure, when the subject pixel (x, y) has the minimum density (0) ("Low" in S141), the subject pixel is always turned OFF.

The output density value Ot(x, y) thus obtained in S160 or S170 is stored in the output image data memory 18 as binary data for the subject pixel (x, y).

Thus, according to the present embodiment, before the subject pixel (x, y) is turned ON in S170, the conversion error E(x, y) is calculated in S145 or S152 through subtracting the maximum density value of 255 from the density I'(x, y) which has been modified in S140. Especially when the subject pixel (x, y) has the maximum density (255) ("High" in S141), the conversion error E(x, y) (=I'-255) is further modified by the correction value "a" in S147 or S148. That is, when the conversion error E(x, y) (=I'-255) is equal to or greater than the corresponding value IE[x], the correction value "a" is subtracted from the conversion error E(x, y) in S147. When the conversion error E(x, y) (=I'-255) is smaller than the corresponding value IE[x], the correction value "a" is added to the conversion error E(x, y) in S148.

Similarly, before the subject pixel (x, y) is turned OFF, the conversion error E(x, y) is calculated in S142 or S156 as a value equal to the density I'(x, y) which has been modified in S140. Especially when the subject pixel (x, y) has the minimum density (0) ("Low" in S141), the conversion error E(x, y) (=I') is further modified by the correction value "a" in S143 or S144. That is, when the conversion error E(x, y) (=I') is equal to or greater than the corresponding value IE[x], the correction value "a" is subtracted from the conversion error E(x, y) (=I'). When the conversion error E(x, y) (=I') is smaller than the corresponding value IE[x], the correction value "a" is added to the conversion error E(x, y) (=I').

After performing the process of S160 or S170, the program proceeds to S190, where the binary conversion error E(x, y) produced at the subject pixel (x, y) in either one of the above-described processes of S143, S144, S147, S148, S152, and S156 is distributed to the error buffer 16 at a location (x+i, y+j) for each of neighboring four pixels not yet processed. The binary conversion error E(x, y) is fractionally distributed to the neighboring pixels in a weighted basis defined by the predetermined error diffusion matrix Bmat() through the following formula (7):

$$e(x+i, y+j)+=Bmat(i, j)\times E(x, y) \quad (7)$$

wherein+= is an operator for calculating a sum of a value already stored in the error buffer (x+i, y+j) and a fraction of the error E(x, y) that is distributed to the corresponding pixel (x+i, y+j) from the subject pixel (x, y). A representative example of the matrix Bmat () is shown in FIG. 4.

As described already, in the matrix Bmat(), * indicates a subject pixel position (x, y), and each value in the matrix indicates a coefficient to be multiplied with the error E(x, y) before being distributed from the subject pixel (x, y) to a neighboring pixel (x+i, y+j), which is located relative to the subject pixel (x, y) as shown in the matrix. Thus distributed error fractional portion is accumulated in a corresponding memory location (x+i, y+j) in the error buffer 16 according to the formula (7). For example, the next pixel (x+1, y) on the same pixel line receives a $\frac{3}{8}^{th}$ part of the error E(x, y). The $\frac{3}{8}^{th}$ part of the error E(x, y) is therefore accumulated in the corresponding memory location (x+1, y) of the error buffer 16.

Next, in S200, it is judged whether or not all the pixels in the present pixel line along the main scanning direction x have been processed. When any pixels remain unprocessed ("no" in S200), a pixel position is shifted to the next pixel position (x+1, y) in S210, and the process returns to S125. Then, the process from S125 is repeated.

When all the pixels have been processed in the subject pixel line ("yes" in S200), on the other hand, it is judged in S220 whether or not all the pixels in the input image have been processed. When any pixels remain unprocessed ("no" in S220), the pixel position is shifted to the next pixel line in the auxiliary scanning direction y in S230. Then, the process returns to S120. Then, the process from S120 is repeated.

Thus, all the pixels (x, y) in the input continuous tone image are subjected to the error-distributing image conversion process on a pixel by pixel basis. That is, the input densities I(x, y) of all the pixels are successively converted into bilevel values Ot(x, y), and are stored in the memory 18.

When all the pixels have been processed ("yes" in S220), this process ends. At this time, a pseudo-halftone binary image is completely produced by the bilevel values Ot(x, y) stored for all the pixels (x, y) in the output image data memory 18.

During the above-described error diffusion image conversion process, when the subject pixel has the minimum value (0) of the density range 0–255 of the continuous tone image data, the flag FLAG is set to Low in S134. Accordingly, the program always proceeds to the process of S160. That is, the minimum density pixel is always turned OFF. Accordingly, if the image D of FIG. 1 is subjected to the conversion process of the present embodiment and if all the pixels in region R2 have minimum densities, all the pixels in region R2 will be turned OFF. No pixels will be turned ON in minimum density region R2.

Similarly, when the subject pixel has the maximum density (255) in the density range 0–255 of the continuous tone image data, the flag FLAG is set to High in S136. Accordingly, the program always proceeds to the process of S170. That is, the maximum density pixel is always turned ON. If the image D of FIG. 1 is subjected to the conversion process of the present embodiment and if all the pixels in region R2 have maximum densities, all the pixels in region R2 will be turned ON. No pixels will be turned OFF in the maximum density region.

In addition, according to the above-described process, binary conversion errors will not be produced uniformly along the main scanning direction x. That is, a binary conversion error produced at the maximum or minimum density pixel is subjected to the modification processes of S143, S144, S147, or S148 with using the predetermined value "a" so that a conversion error pattern produced by the conversion errors occurred at the maximum and minimum density pixels will gradually change to approach the non-uniform value pattern IE[pos]. Accordingly, even when the minimum or maximum density region is successively processed to the binary conversion process of FIGS. 5 and 6, conversion errors will not be uniformly distributed to pixels along each pixel line.

Accordingly, the leading edge S of region S3 will not be supplied with uniform errors from the region R2. Turned-ON or turned-OFF pixels will be produced properly non-uniformly, thereby preventing occurrence of any undesirable textures.

Especially, as described above, the pattern IE[pos] is comprised of the plurality of binary conversion error sums e(x, y) which are arranged in the main scanning direction and which have been obtained through error-diffusion converting the uniform density continuous tone image having the single low density of ten (10). Accordingly, no undesirable textures will be produced on the pseudo-halftone image.

As described above, the process of S132 serves to judge whether the subject pixel is a minimum density pixel, a maximum density pixel, or a pixel having a middle density higher than the minimum density and lower than the maximum density. The processes of S142 and S146 serve to compare the modified density (=binary conversion error E) with the corresponding value in the non-uniform pattern IE[pos]. The processes of S143, S144, S147, and S148 serve to modify the binary conversion error.

As described above, according to the present embodiment, the minimum density pixel is always turned OFF. The maximum density pixel is always turned ON. The binary conversion errors obtained along the main scanning direction based on the maximum and minimum density pixels are subjected to the modification processes of S142–S148 with using the correction value "a". Thus, the binary conversion errors are gradually converted into the non-uniform value pattern IE[pos]. Accordingly, uniform conversion errors will not be distributed to pixels along each main scanning line. The leading edge S of the middle density region will not receive uniform conversion errors. Turned-On pixels will be generated properly non-uniformly, thereby preventing occurrence of any undesirable textures.

It is noted that functions for achieving the above-described image conversion processes are stored as the computer program that are executed on the computer system 2. The program is stored on a data storage medium capable of being read by the computer system 2. In the present embodiment, the program is stored in the ROM 12 capable of being read by the computer 2. The ROM 12 is installed in the computer system 2. However, the program may be stored in a backup RAM capable of being read by the computer 2. The backup RAM may be installed in the computer 2.

Or, the program may be stored in the external storage device 23 such as a floppy disk, a magneto-optic disk, a CD-ROM, a hard disk, or the like. The program is loaded into the computer system 2 and is executed as needed.

[Second embodiment]

A second embodiment of the present invention will be described below with referring to FIG. 7.

The present embodiment is the same as the first embodiment except that the processes of FIG. 6 are replaced with processes of FIG. 7 and that the process of S120 in FIG. is modified to initialize, to zero (0), not only the x-coordinate pixel value x but also an accumulation value ES (which will be described later).

Figure 7:
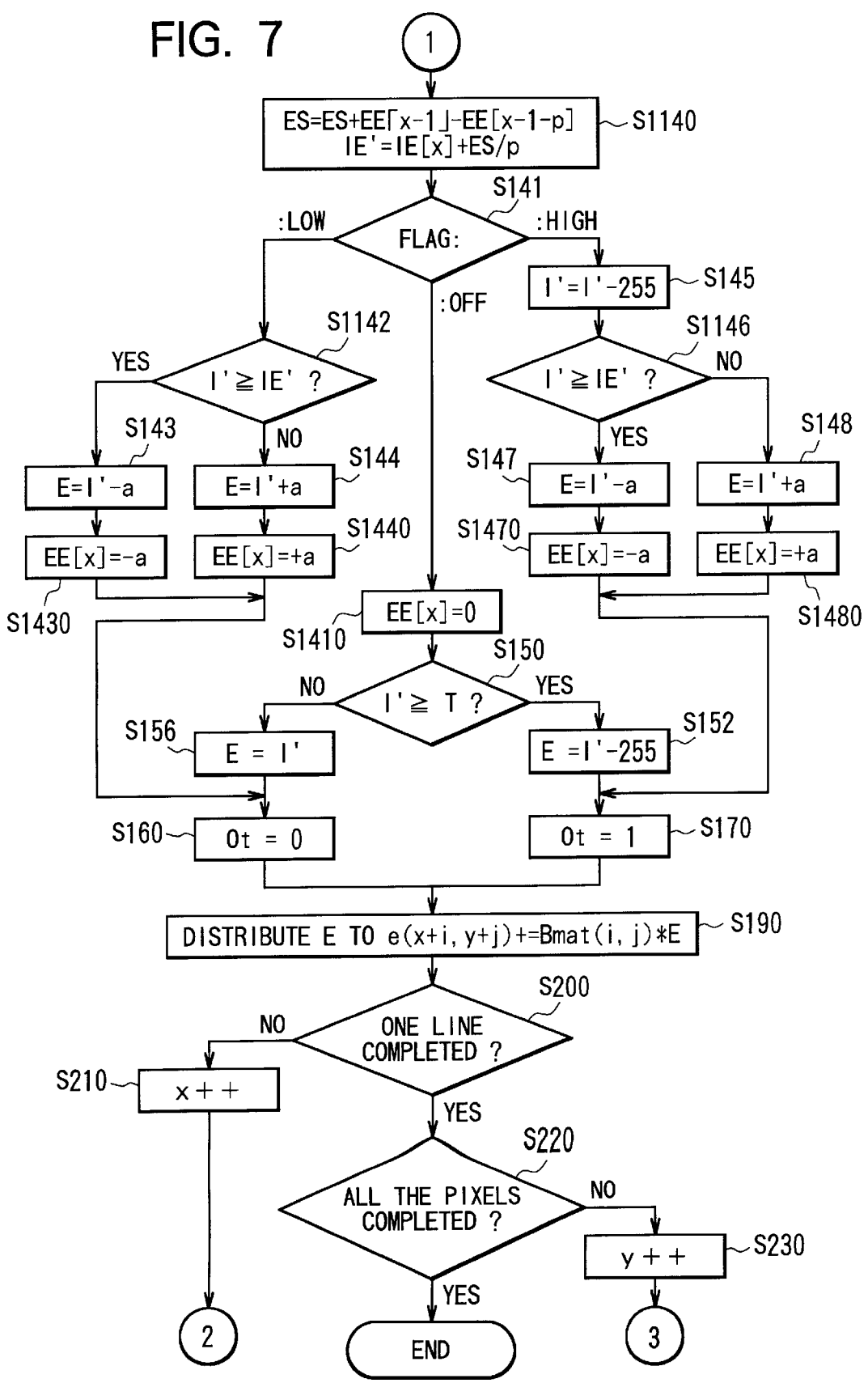
FIG. 7 is a part of a flow chart of an error diffusion type image conversion process of a second embodiment employed by the image conversion device of FIG. 2, and corresponds to FIG. 6.

The processes of FIG. 7 are the same as the processes of FIG. 6 except that in the processes of FIG. 7, a process of S1140 is added before the process of S141, processes of S1142 and S1146 are provided in place of the processes of S142 and S146, a process of S1410 is added after the process of S141 and before the process of S150, processes of S1430 and S1440 are added after the processes of S143 and S144 and before the process of S160, and processes of S1470 and S1480 are added after the processes of S147 and S148 and before the process of S170.

According to the present embodiment, after the process of S140 in FIG. 5 is performed, the program proceeds to S1140 in FIG. 7. In S1140, the CPU 11 calculates the following formulas (8) and (9):

$$ES[x]=ES[x-1]+EE[x-1]-EE[x-1-p] \quad (8)$$

$$IE'[x]=IE[x]+ES[x]/p \quad (9)$$

where EE[k]=0 where k<0 and "p" is an integer such as eight (8) or sixteen (16). In this example, p is equal to six (6).

The formula (8) is calculated to obtain an accumulation value ES[x] for the subject pixel (x, y) based on another accumulation value ES[x−1] which has been obtained for a neighboring pixel (x−1, y) that is located on the same pixel line with the subject pixel (x, y) neighboring to the subject pixel (x, y) and that has been subjected to the binary conversion process immediately before the subject pixel (x, y). The accumulation value ES[x] is obtained for the subject pixel (x, y) through adding the accumulation value ES[x−1] for the neighboring pixel (x−1, y) with a modification amount EE[x−1], by which a conversion error E(x−1, y) has been modified during the binary conversion process for the neighboring pixel (x−1, y).

When the x-coordinate of the subject pixel (x, y) is equal to or greater than p+1, i.e., x≧p+1, the accumulation value ES[x] is further subjected to a subtracting calculation. In the subtracting operation, another modification amount EE[x−1−] is subtracted from the sum of the accumulation value ES[x−1] and the modification amount EE[x−1]. The modification amount EE[x−1−p] is defined as a modification amount, by which a conversion error E(x−1−p, y) has been modified during a binary conversion process for still another pixel (x−1−p, y), that is located in the same pixel line with the subject pixel (x, y) and that is separated from the subject pixel (x, y) by the p-number pixels' worth of distance. The pixel (x−1−p, y) has already been subjected to the conversion process p-number of times' worth of conversion processes before the subject pixel (x, y).

As will be described later, during the binary conversion process for each pixel (x, y), a value EE[x] is set as a modification amount, by which the corresponding binary conversion error E(x, y) is modified. More specifically, similarly to the first embodiment, if the subject pixel (x, y) has the maximum or minimum density, its conversion error E(x, y) is modified through a subtracting or adding calculation with the correction value of "a". If the error E(x, y) is subjected to the subtracting calculation, the modification amount EE[x] is set to a value of "−a". If the error E(x, y) is subjected to the adding calculation, the modification amount EE[x] is set to another value of "+a". On the other hand, when the subject pixel (x, y) has some middle density higher than the minimum density and lower than the maximum density, the conversion error E(x, y) is not modified, and therefore the modification amount EE[x] is set to a value of zero (0).

According to the formula (8), therefore, the value ES[x] is defined for the subject pixel (x, y) as an accumulation amount of "p" or less number of modification amounts EE, by which already-processed "p" or less number of successive pixels have been subjected to the error modification processes immediately before the subject pixel (x, y). These "p" or less number of successive pixels are arranged in the same pixel line with the subject pixel (x, y) and are located immediately before the subject pixel (x, y). That is, if the x-coordinate of the subject pixel (x, y) is equal to or lower than p, ES[x] is calculated as a sum of the modification amounts EE[0] through EE[x−1], by which error modification has been attained at successive pixels (0, y) to (x−1, y). If the x-coordinate of the subject pixel (x, y) is greater than p, ES[x] is calculated as a sum of modification amounts EE[x−p] through EE[x−1], by which error modification has been attained at p-number of successive pixels (x−p, y) to (x−1, y).

It is now assumed that the image D of FIG. 1 is subjected to the conversion process of the present embodiment. In the maximum or minimum density region R2 at its part where x>p, the accumulated value ES for each pixel (x, y) becomes equal to the sum of modification amounts EE, by which p (six, in this example) number of successive pixels, located immediately before the subject pixel (x, y) along the same pixel line x, have been modified in their conversion errors E.

According to the present embodiment, the value IE[x] in the non-uniform pattern IE[pos] to be used for the subject pixel (x, y) is modified into a modified value IE'[x] by the amount ES[x]/p through the formula (9). The amount ES[x]/p is defined as an average of the modification amounts, by which the p-number of successive pixels have been modified in their conversion errors E immediately before the subject pixel (x, y).

According to the present embodiment, the thus modified pattern IE'[x] is used in the processes of S1142 and S1146 for being compared with the conversion error E(x, y), which is obtained at the subject pixel (x, y) having the minimum or maximum density ("Low" of "High" in S141).

If the conversion error E(x, y) is equal to or greater than the modified value IE'[x] ("Yes" in S1142 or S1146), the correction value "a" is subtracted from the conversion error E(x, y) in S143 or S147. Then, in the process of S1430 or S1470, the modification amount EE[x] is set to "−a". If the conversion error E(x, y) is smaller than the modified value IE'[x] ("No" in S1142 or S1146), on the other hand, the correction value "a" is added to the conversion error E(x, y) in S144 or S148. Then, in the process of S1440 or S1480, the modification amount EE[x] is set to "a". It is noted that if the subject pixel has the middle density ("off" in S141), the conversion error E(x, y) is not modified, and therefore the modification amount EE[x] is set to zero (0) in S1410. Accordingly, the accumulated value ES does not change at the middle density pixel.

During the above-described processes of the present embodiment, the value ES[x]/p to be used for the subject pixel (x, y) is affected from the relationship between the values of the non-uniform pattern IE[pos] and the values of the conversion errors E obtained at the p-number of successive pixels located immediately before the subject pixel (x, y). With the average value ES/p, the value IE[x] for the subject pixel (x, y) is modified into the modified value IE'[x]. Because the values IE[x] in the pattern IE[pos] are successively modified by the average values ES[x]/p, the non-uniform pattern IE[pos] is entirely modified into the pattern IE'[pos] to have the average or total value of the conversion errors E(x, y) obtained at the corresponding pixels (x, y).

At each pixel (x, y), the conversion error E(x, y) is it@ compared with the thus modified value IE'[x]. Accordingly, the judgment processes of S1142 and S1146 will result in affirmative and negative judgments substantially at an equal possibility. As a result, the number of pixels subjected to the subtracting processes of S143 and S147 will be substantially equal to the number of pixels subjected to the adding processes of S144 and S148.

Accordingly, even in the uniform density region whose all the pixels have the density of zero (0), the average or total values of the conversion errors will not change. Similarly, even in the uniform density region whose all the pixels have the density of 255, the average or total values of the conversion errors will not change, either. It is possible to suppress changes in the total brightness of the pseudo-halftone image from the original brightness of the input continuous tone image. It is possible to provide a high quality pseudo-halftone image.

In the above-described second embodiment, the processes of S1142 and S1146 serve to compare the conversion error with the modified value in the non-uniform value pattern. The processes of S1140, S143, S1430, S144, S1440, S147, S1470, S148, and S1480 serve to change the conversion error pattern, produced on the pixels arranged along the main scanning direction, to approach the non-uniform numeric value pattern IE[pos] while maintaining the average or total value of the conversion error pattern.

[Third Embodiment]

Figure 8:
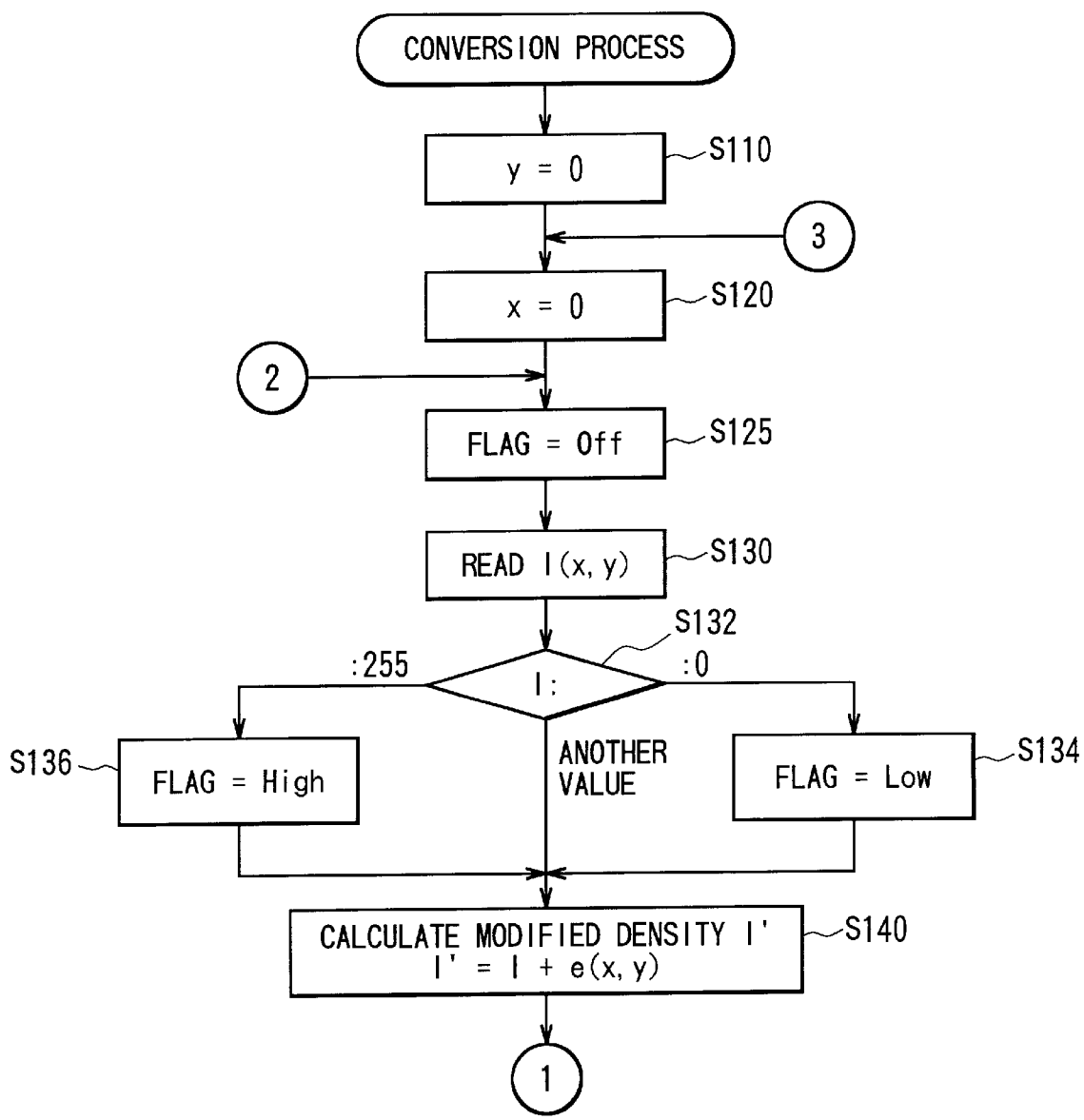
FIG. 8 is a part of a flow chart of a minimized average error type image conversion process according to a third embodiment employed by the image conversion device of FIG. 2.
Figure 9:
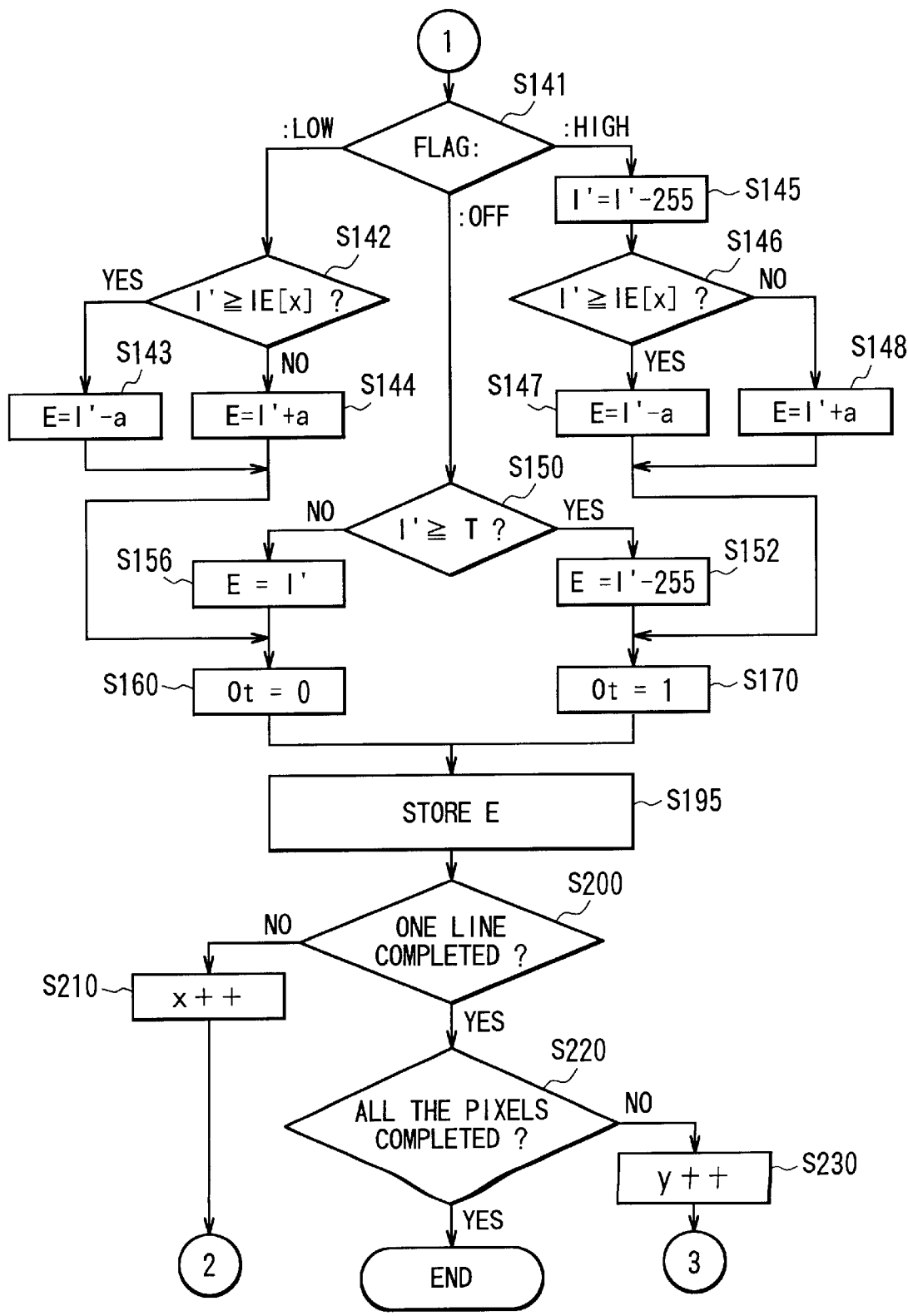
FIG. 9 is a remaining part of the flow chart of the minimized average error type image conversion process.

A third preferred embodiment of the present invention will be described below with reference to FIGS. 8 and 9.

The error-distributing image conversion process employed in the first and second embodiments is of the error diffusion type for distributing an error, generated when each pixel is processed, to neighboring pixels not yet processed. However, the error-distributing image conversion process of the present invention may be designed to be of the minimized average error type for adding, to a density value of a subject pixel to be processed, fractional portions of binary-conversion errors which have been generated when already-processed neighboring pixels were processed.

The error-distributing image conversion method of the third embodiment is of the minimized average error type.

The image conversion process of the third embodiment is the same as that of the first embodiment shown in FIGS. 5 and 6 except that the density modification process of S140 is processed as described below and that the error distributing process of S190 is replaced with an error storing process of S195. The image conversion process of the present embodiment can be attained also by the image conversion device (computer) 2 of FIG. 2.

In the error storing process of S195, according to the present embodiment, the conversion error E(x, y) calculated in S143, S144, S156, S147, S148, or S152 for the subject pixel (x, y) is merely stored in a corresponding location (x, y) of the subject pixel in the error buffer 16. Thus, according to the present embodiment, the error buffer 16 is used to store a conversion error E(x, y) for each pixel obtained when that pixel is processed.

In the density modification process of S140, the error sum e(x, y), to be distributed to the subject pixel (x, y) from already-processed four neighboring pixels (x−1, y−1), (x, y−1), (x+1, y−1), and (x−1, y), is first calculated based on a predetermined coefficient matrix α and binary conversion errors E(x−1, y−1), E(x, y−1), E(x+1, y−1), and E(x−1, y) which have been generated during the conversion processes at the neighboring four pixels. That is, the error sum e(x, y) for the subject pixel (x, y) is calculated through the following formula (10):

$$e(x,y) = (1/\Sigma \alpha ab) \times \Sigma(\alpha ab E\ ab) \quad (10)$$

The coefficient matrix α is shown below. This matrix α is stored in the memory 12 shown in FIG. 2.

$$\alpha \equiv \begin{pmatrix} 1 & 3 & 1 \\ 3 & * & \end{pmatrix}$$

where α ab is a coefficient value located at a location (a, b) in the matrix α where −1≦a≦1, −1≦b≦0. Eab is a binary conversion error E(x+a,y+b) generated at an already-processed pixel (x+a,y+b) neighboring to the subject pixel (x, y). The neighboring pixel (x+a,y+b) is located at a position corresponding to a location (a, b) relative to the subject pixel (x,y) indicated by * in the coefficient matrix α. The error Eab, i.e., E(x+a,y+b) is retrieved from a corresponding location (x+a,y+b) of the error buffer 16. Then, the modified density I' for the subject pixel (x, y) is calculated through the formula (1) with using the error sum e(x, y) calculated as described above through the formula (10).

In a similar manner, the conversion process of the second embodiment may be modified into the minimized average error type.

[Fourth Embodiment]

Figure 10:
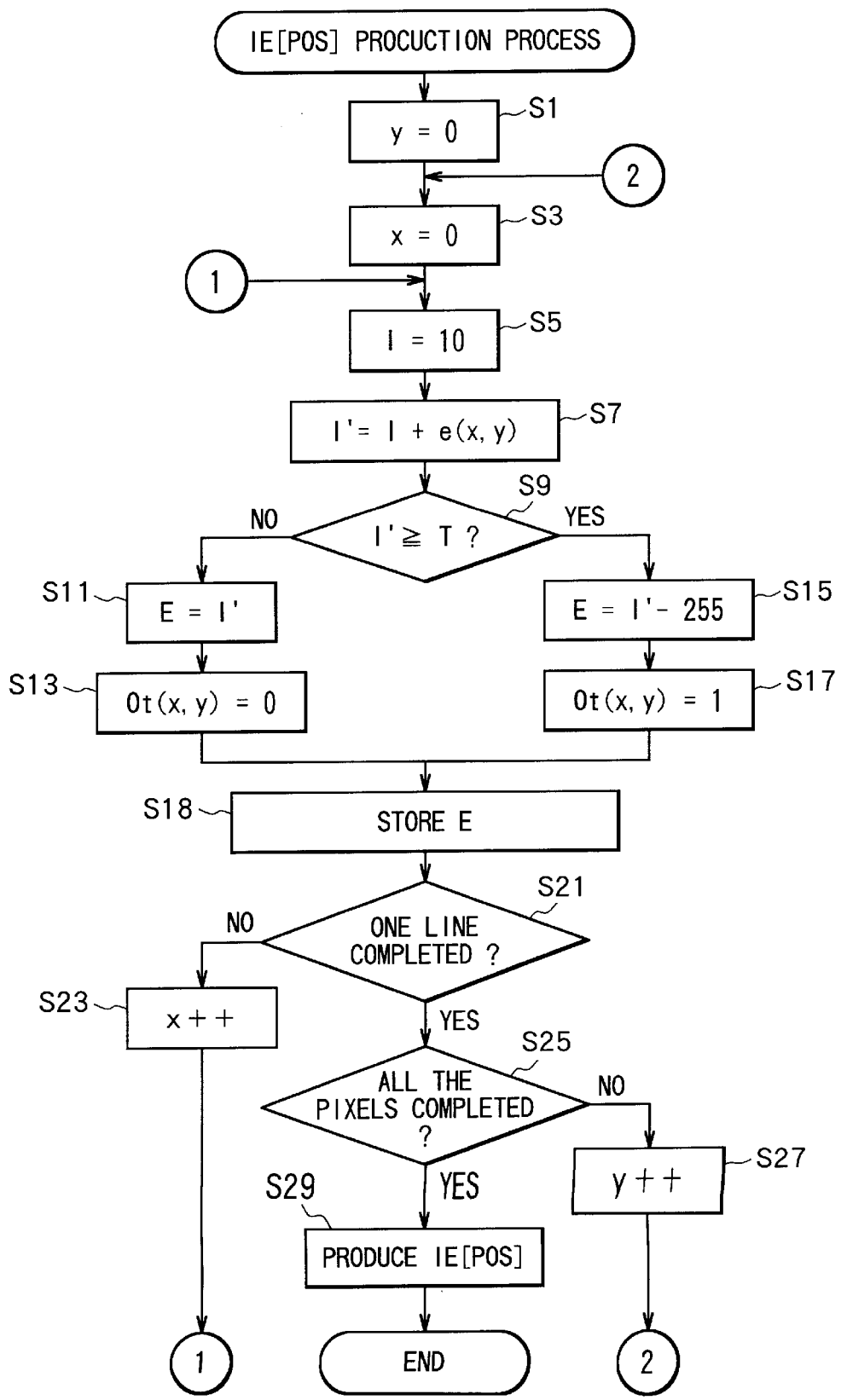
FIG. 10 is a flow chart of a non-uniform numerical value pattern production process of a minimized average error type according to a fourth embodiment employed by the image conversion device of FIG. 2.

A fourth embodiment of the present invention will be described below with reference to FIG. 10.

Figure 3:
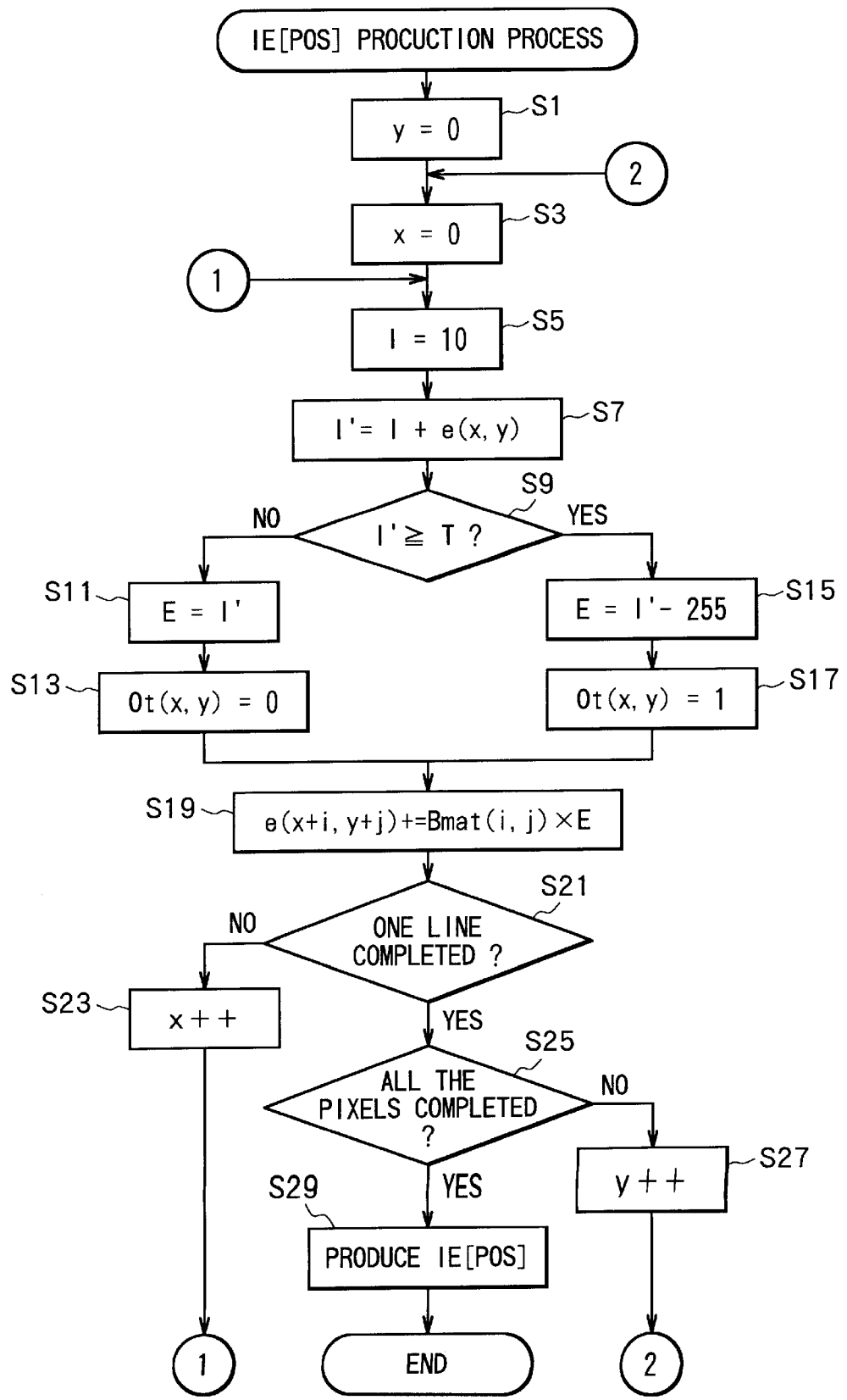
FIG. 3 is a flow chart of a non-uniform numerical value pattern production process of an error diffusion type employed by the image conversion device of FIG. 2.

In the first embodiment, the process of FIG. 3 for producing the non-uniform value pattern IE[pos] is of the error diffusion type. However, this process may also be designed to be of the minimized average error type.

The non-uniform value pattern production method of the fourth embodiment is of the minimized average error type.

The non-uniform value pattern production process of the fourth embodiment is the same as that of the first embodiment shown in FIG. 3 except that the density modification process of S7 is processed as described below and that the error distributing process of S19 is replaced with an error storing process of S18. The non-uniform value pattern production process of the present embodiment can be attained also by the image conversion device (computer) 2 of FIG. 2.

In the error storing process of S18, according to the present embodiment, the conversion error E(x, y) calculated in S11 or S15 for the subject pixel (x, y) is merely stored in a corresponding location (x, y) of the subject pixel in the error buffer 16. Thus, according to the present embodiment, the error buffer 16 is used to store a conversion error E(x, y) for each pixel obtained when that pixel is processed.

In the density modification process of S7, the error sum e(x, y), to be distributed to the subject pixel (x, y) from already-processed four neighboring pixels (x−1, y−1), (x, y−1), (x+1, y−1), and (x−1, y), is first calculated based on the above-described coefficient matrix α and binary conversion errors E(x−1, y−1), E(x, y−1), E(x+1, y−1), and E(x−1, y) which have been generated during the conversion processes at the neighboring four pixels. That is, the error sum e(x, y) for the subject pixel (x, y) is calculated through the above-described formula (10). Then, the modified density I' for the subject pixel (x, y) is calculated through the formula (1) with using the error sum e(x, y) calculated as described above through the formula (10).

According to the present embodiment, therefore, the conversion errors obtained in S11 or S15 for the respective pixels (x, y) are stored at the corresponding memory locations (x, y) in the error buffer 16. As in the first embodiment, a stable region is selected from the obtained pseudo-halftone image along the main scanning direction. Then, the conversion errors E(x, y), obtained and stored for the pixels constituting the selected stable region, are arranged in the table and are stored as the pattern IE[pos] in the memory 14.

[Fifth Embodiment]

Figure 11:
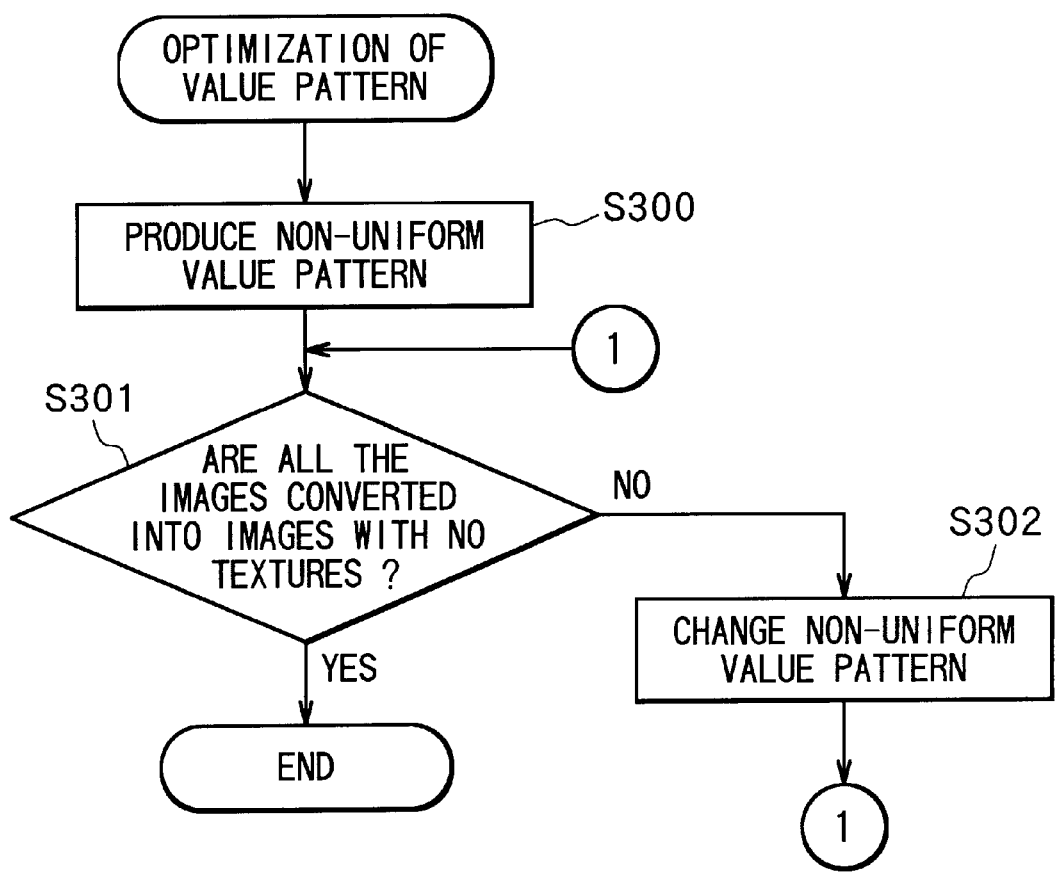
FIG. 11 is a flow chart of a non-uniform numerical value pattern production process according to a fifth embodiment employed by the image conversion device of FIG. 2.

A fifth embodiment of the present invention will be described below with reference to FIG. 11.

The present embodiment provides an improved method for producing the non-uniform value pattern IE[pos] optimum for being used in the image conversion process of the above-described embodiments.

It is assumed that a certain non-uniform numerical value pattern IE[pos] can convert a certain uniform density continuous tone image with a single uniform density of a certain value into a pseudo-halftone image with no undesirable textures. However, the non-uniform numerical value pattern IE[pos] may possibly convert another certain uniform density continuous tone image with a single uniform density of another value into a pseudo-halftone image with some undesirable textures. In order to overcome this problem, according to the present embodiment, an optimum non-uniform numerical value pattern IE[pos] is produced so as to be capable of converting any uniform density continuous tone images with their uniform densities falling in the range between (the minimum density+1) to (the maximum density−1) into pseudo-halftone images with no undesirable textures.

The non-uniform pattern IE[pos] can be produced in a manner described below with reference to FIG. 11.

First, a provisional pattern is produced in S300 through executing the process of FIG. 3 in the first embodiment. That is, a certain value (10, for example) is set in S5 in FIG. 3, and the processes of FIG. 3 are performed to produce a pseudo-continuous tone image. In S29, conversion errors are retrieved from the error buffer 16 for a certain stable region of the obtained pseudo-halftone image. The provisional pattern is produced based on the thus retrieved conversion errors.

Then, in S301, a plurality of, 254 in this example, different uniform density continuous tone images F1–F254 are prepared. In each uniform density continuous tone image Fi ($1 \leq i \leq 254$), a plurality of pixels are arranged both in the main scanning direction x and in the auxiliary scanning direction y. All the pixels in each continuous tone image Fi ($1 \leq i \leq 254$) has the same corresponding density i ($1 \leq i \leq 254$). Also in S301, all the continuous tone images F1–F254 are successively converted into pseudo-halftone images H1–H254 through executing the image conversion processes of FIGS. 5 and 6 of the first embodiment with using the provisional pattern as the non-uniform pattern IE[pos]. Then, it is judged whether or not any undesirable textures are produced in each of the obtained pseudo-halftone images H1–H254. If undesirable textures are produced as noticeable in at least one of the pseudo-halftone images H1–H254 ("no" in S301), the provisional pattern is changed in S302.

During the process of S302, another provisional pattern is produced through again executing the process of S29 in FIG. 3 based on the pseudo-continuous tone image which has been obtained in the process of S300. That is, conversion errors are retrieved from the error buffer 16 for another visually-perceived stable region in the pseudo-halftone image produced in the process of S300. Then, a new provisional pattern is produced based on the retrieved conversion errors.

Or, in S302, the entire pattern production process of FIG. 3 may be again performed through setting another value in S5. A pseudo-halftone image is produced again. Conversion errors are retrieved from the error buffer 16 for a visually-perceived stable region in the pseudo-halftone image. Then, a new provisional pattern is produced based on the retrieved conversion errors.

Then, the program returns to S301, and the process of S301 is performed with using the new provisional pattern. Thus, the processes of S301–S302 are repeated while changing the provisional pattern until all the uniform density continuous tone images F1–F254 are properly converted into pseudo-halftone continuous images H1–H254 with no noticeable undesirable textures ("Yes" in S301). An optimum pattern IE[pos] is set to a provisional pattern that has been used when all the continuous tone images F1–F254 were properly converted in S301 into pseudo-halftone continuous images H1–H254 with no noticeable undesirable textures ("Yes" in S301). In other words, a provisional pattern, that can properly convert all the images F1–F254 into the pseudo-halftone images H1–H254 with no noticeable textures, is set as the optimum non-uniform numerical value pattern IE[pos].

According to this method, the optimum non-uniform numerical value pattern IE[pos] is obtained, and stored in the memory 14. This pattern IE[pos] can convert any uniform density continuous tone images with uniform densities in the range from (the minimum density+1) to (the maximum density−1) into pseudo-halftone images with no undesirable textures. Accordingly, the pattern IE[pos] can convert any input continuous tone images into pseudo-halftone images with no undesirable textures.

In the present embodiment, the pattern production process of S300 and the uniform image conversion process of S301 are performed with using the error-diffusion method as in the first embodiment. However, those processes may be performed with using the minimized average error method as in the third and fourth embodiments. The uniform image conversion process of S301 may be performed in the manner as in the second embodiment.

[Sixth embodiment]

The non-uniform pattern production process of FIG. 3 according to the first embodiment is modified in the present embodiment.

According to the present embodiment, the non-uniform numerical value pattern IE[pos] is constructed only from numerical values equal to or smaller than the threshold T.

According to the present embodiment, the process of S19 in FIG. 3 is designed to subtract a predetermined value (d) from the calculated error accumulation value e(x, y). The value (d) is predetermined so as to be capable of setting the error accumulation amounts e(x, y) for all the pixels to be lower than the threshold value T.

Or, the process of S19 may be designed to include a step of comparing the calculated error accumulation e(x, y) with the threshold T. When the calculated error accumulation e(x, y) is judged to be greater than the threshold T, the error accumulation e(x, y) is modified to be equal to the threshold value T.

Or, each of the processes of S11 and S15 may be designed to store the calculated error amount E(x, y) for the subject pixel. Accordingly, the error amounts E(x, y) are stored for all the pixels (x, y). In this modification, a part of the thus stored error amounts E(x, y) is set as the non-uniform pattern IE[pos]. More specifically, conversion errors E(x, y), obtained and stored for those pixels that constitute the stable region in the obtained pseudo-halftone image, are arranged in the table and are stored as the pattern IE[pos] in the memory 1. Because E(x, y) has a value of I' or I'−255, the value of E(x, y) is always smaller than the threshold value T. Accordingly, the pattern IE[pos] can be made only from values smaller than T.

When the non-uniform pattern IE[pos] is thus produced from values equal to or smaller than the threshold value T, it becomes possible to suppress occurring of dots in each scanning line during the image conversion process.

While the invention has been described in detail with reference to the specific embodiments thereof, it would be apparent to those skilled in the art that various changes and modifications may be made therein without departing from the spirit of the invention.

For example, the non-uniform numerical value pattern IE[pos] can be produced through calculating a predetermined blue noise power spectrum and through judging the values of the obtained result.

Or, the non-uniform numerical value pattern IE[pos] may be comprised of a plurality of uniform random numbers. For example, the pattern IE[pos] can be produced from uniform random numbers RND obtained through repeatedly calculating the following formulas (12) and (13):

$$RB = RB \times 1103515245 + 12345 \quad (12)$$

$$RND = RB >> 27 \quad (13)$$

The formula (13) is for shifting the value of RB by 27 bits rightwardly. The formula (13) therefore serves to subject the value RB to a dividing process. Then, the upper five bits of the obtained result is used as the value RND in the formula (13).

In the above-described embodiments, the conversion error E(x, y) is modified through subtracting the correction value "a" from the original error or adding the correction value "a" to the original error. However, the conversion error E(x, y) may be modified through multiplying the original error with the correction value a or through dividing the original error by the correction value "a".

The correction value "a" is preferably determined based on a difference between the original binary conversion error E(x, y) and the corresponding value IE[x] in the non-uniform numerical value pattern IE[pos]. That is, when the difference between the values of E(x, y) and IE[x] is large, the correction value "a" is set to a large value so as to be capable of rapidly disturbing the uniform condition of the conversion error E. When the difference between the values of E(x, y) and IE[x] is small, on the other hand, the correction value "a" is set to a small value so as not to modify the conversion error E too largely from the original value, thereby preventing the density of the pseudo-halftone image Ot from being shifted largely from the original density I.

The correction value "a" can be adjusted according to a maximum or minimum density state in the neighborhood of the subject pixel (x, y). This adjustment process can properly prevent the conversion errors from becoming uniform while preventing the density Ot of the pseudo-halftone image from being largely shifted from the original density I.

Figure 12:
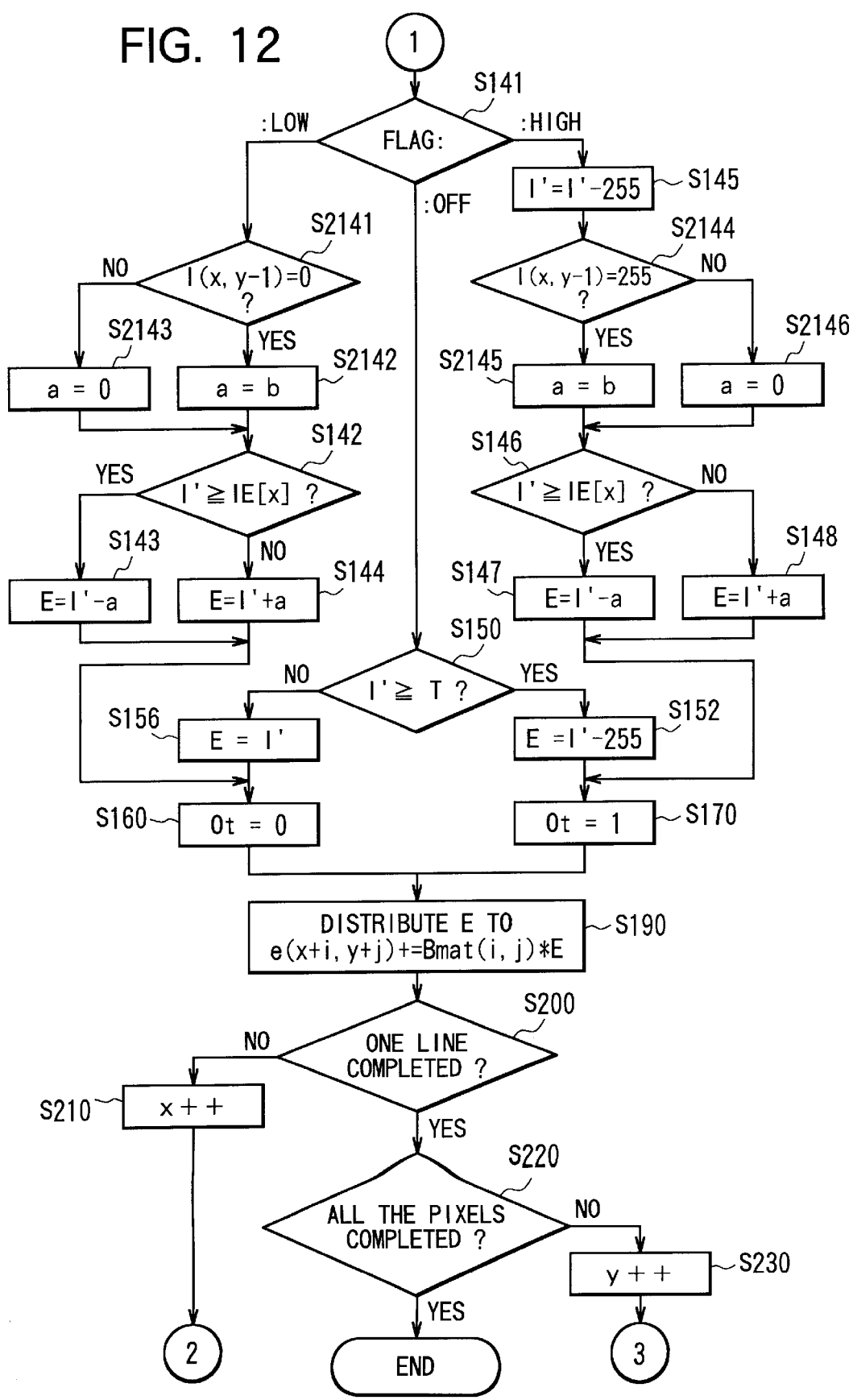
FIG. 12 is a flow chart of a part of an error diffusion type image conversion process according to a modification and corresponds to FIG. 6.

In order to perform this correction value adjustment operation, the error diffusion image conversion process of the first embodiment can be modified as shown in FIG. 12. That is, the process of FIG. 6 is modified as shown in FIG. 12. In this modification, processes of S2141–S2143 are added between the processes of S141 and S142, and processes of S2144–S2146 are added between the processes of S145 and S146. The processes of S2141 and S2144 are designed to judge the original density state of a pixel (x, y−1) which is located neighboring to the subject pixel (x, y). The pixel (x, y−1) is located in the upstream side of the subject pixel (x, y) in the auxiliary scanning direction y, and has already been subjected to the conversion process when the subject pixel (x, y) is subjected to a conversion process.

According to this modification, when the subject pixel (x, y) has the minimum density ("Low" in S141), the program proceeds to S2141 where it is judged whether or not the neighboring pixel (x, y−1) originally has the minimum density I(x, y−1) of zero (0). When the neighboring pixel (x, y−1) does not have the minimum density ("No" in S2141), the correction value "a" is set to zero (0) in S2143. When the neighboring pixel (x, y−1) has the minimum density ("Yes" in S2141), on the other hand, the correction value "a" is set in S2142 to a value "b" which is greater than zero (0). Then, the program proceeds to S142. In S142 and S143 or S144, the conversion error E(x, y) is modified with using the correction value "a". Accordingly, when the correction value "a" is set to zero (0) in S2143, the conversion error E(x, y) is not changed.

Similarly, when the subject pixel has the maximum density ("High" in S141), after the modified density I'(x, y) is modified in S145, the program proceeds to S2144 where it is judged whether or not the neighboring pixel (x, y−1) originally has the maximum density I(x, y−1) of 255. When the neighboring pixel (x, y−1) does not have the maximum density ("No" in S2144), the correction value "a" is set to zero (0) in S2146. When the neighboring pixel (x, y−1) has the maximum density ("Yes" in S2144), on the other hand, the correction value "a" is set to the value "b" in S2145. Then, the program proceeds to S146. In S146 and S147 or S148, the conversion error E(x, y) is modified with using the correction value "a". Accordingly, when the correction value "a" is set to zero (0) in S2146, the conversion error E(x, y) is not changed.

Thus, according to this modification, the correction value "a" is changed for every pixel (x, y) according to the original density state of the pixel (x, y−1) which is located on a main scanning line that is in the upstream side of the main scanning line where the subject pixel (x, y) is located.

The above-described modification is applied to the error-diffusion type image conversion process of the first embodiment. However, this modification can be applied to the minimized average error method of the third embodiment.

In the above-described embodiments, the non-uniform pattern IE[pos] is produced in the one-dimensional pattern. That is, the non-uniform numerical value pattern IE[pos] is produced to extend one-dimensionally. However, the non-uniform pattern IE[pos] may be produced in a two-dimensional pattern. That is, the non-uniform numerical value pattern IE[pos] may be produced to extend not only in the main scanning direction but also in the auxiliary scanning direction.

In the above-described first embodiment, when the calculated conversion error E(x, y) is equal to the corresponding value in the non-uniform pattern IE[pos] in S142 and S146, the conversion error E(x, y) is subjected to the subtracting processes of S143 and S147. However, in this case, the conversion error E(x, y) may not be subjected to any modification processes, i.e., the subtracting processes of S143 and S147 or the adding processes of S144 and S148. The conversion error E(x, y) may be diffused to neighboring pixels as it is in S190. The same modification can be applied to other embodiments.

In the above-described embodiments, all the scanning lines are scanned in the main scanning direction from left to right as shown in FIG. 1. However, the main scanning operation can be performed in alternate directions. That is, on the odd-numbered scanning lines, the main scanning operation is performed from left to right. On the even-numbered scanning lines, the main scanning operation is performed from right to left. When this modification is applied to the second embodiment, the process of S120 may be designed to initialize only the x-coordinate pixel value x to zero (0).

In the conversion processes of the above-described embodiments, both of the maximum density pixels and the minimum density pixels are adjusted in their conversion errors in S143, S144, S147, and S148. However, only the maximum density pixels may be adjusted in their conversion errors in S147 and S148. In this case, the judging process of S132 may judge whether the subject pixel is the maximum density or not, and the judging process of S141 may judge whether the flag is high or off. The processes of S134, S142, S143 (and S1430), and S144 (and S1440) are omitted. Or, only the minimum density pixels may be adjusted in their conversion errors in S143 and S144. In this case, the judging process of S132 may judge whether the subject pixel is the minimum density or not, and the judging process of S141 may judge whether the flag is low or off. The processes of S136, S145, S146, S147 (and S1470), and S148 (and S1480) are omitted.

In the above-described embodiments, the non-uniform pattern IE[pos] is produced before the device 2 is shipped from the factory. However, the non-uniform pattern IE[pos] may be produced after the device 2 is shipped from the factory. For example, a user of the device 2 may produce his/her desired non-uniform pattern IE[pos] through executing the program of FIG. 3, FIG. 10, or FIG. 11.

In the fifth embodiment, all the 254 uniform density continuous tone images F1–F254 are converted into pseudo-halftone images H1–H254 in S301. However, at least one uniform density continuous tone image Fi may be converted into a pseudo-halftone image Hi in S301. A provisional pattern, that can properly convert all the at least one image Fi into the pseudo-halftone Image Hi with no noticeable textures, is set as the non-uniform numerical value pattern IE[pos].

What is claimed is:

1. A method for converting a continuous tone image into a pseudo-halftone image, the method comprising the steps of:

receiving data of a continuous tone image desired to be converted into a pseudo-halftone image, the continuous tone image having a plurality of pixels, each pixel having one density value defined in a range between a predetermined minimum density and a predetermined maximum density; and subjecting all the pixels of the continuous tone image to an error-distributing binary conversion process on a pixel by pixel basis along a main scanning direction, to thereby convert the density values of the pixels into binary values while calculating binary conversion errors and distributing the calculated binary conversion errors to neighboring pixels, while performing at least one of a first converting process and a second converting process, the first converting process being for compulsively converting a minimum density pixel that has the minimum density into a first binary value and adjusting a binary conversion error produced for the minimum density pixel into a non-uniform error value, the second converting process being for compulsively converting a maximum density pixel that has the maximum density into a second binary value and adjusting a binary conversion error produced for the maximum density pixel into another non-uniform error value.

2. A method as claimed in claim 1, wherein the first converting process adjusts the binary conversion error in correspondence with a numerical value, in a non-uniform numerical value pattern, set for a position of the minimum density pixel along the main scanning direction, and wherein the second converting process adjusts the binary conversion error in correspondence with another numerical value, in the non-uniform numerical value pattern, set for a position of the maximum density pixel along the main scanning direction.

3. A method as claimed in claim 2, wherein the error-distributing binary conversion step subjects all the pixels of the continuous tone image successively to the error-distributing binary conversion process along the main scanning direction, a series of the error-distributing binary conversion processes successively performed along the main scanning direction being successively performed along an auxiliary scanning direction orthogonal to the main scanning direction.

4. A method as claimed in claim 2, wherein the error-distributing binary conversion step includes the steps of:

(a) judging whether a pixel to be processed to the error-distributing binary conversion process has the minimum density, the maximum density, or another value different from the minimum density;

(b) calculating a modified density for the subject pixel through adding the density of the subject pixel with fractional portions of errors distributed from the already-processed pixels neighboring to the subject pixel;

(c) comparing the modified density with a predetermined threshold value when the subject pixel is other than the maximum density or the minimum density, and converting the subject pixel into the first binary value when the modified density is smaller than the threshold value, and converting the subject pixel into the second binary value when the modified density is equal to or greater than the threshold value;

(d) compulsively converting the subject pixel into the first binary value when the subject pixel has the minimum density, and compulsively converting the subject pixel into the second binary value when the subject pixel has the maximum density;

(e) calculating the conversion error to be distributed from the subject pixel to pixels neighboring to the subject pixel, the conversion error being calculated as equal to the modified density when the subject pixel is converted into the first binary value, the conversion error being calculated as equal to a value obtained through subtracting the maximum density from the modified density when the subject pixel is converted into the second binary value;

(f) modifying the conversion error, when the subject pixel has either the maximum density or the minimum density, in accordance with a numerical value, in the non-uniform numerical value pattern, set for the position of the subject pixel along the main scanning direction; and (g) repeating the steps (a) through (f) for all the pixels within the continuous tone image, thereby producing the pseudo-halftone image.

5. A method as claimed in claim 4, wherein the error-distributing binary conversion step further includes the steps of:

distributing fractions of the calculated conversion error to unprocessed neighboring pixels according to a predetermined weighting manner; and accumulating, in an error buffer prepared for each of the unprocessed neighboring pixels, the corresponding fraction of the calculated conversion error with already-accumulated fractions of conversion errors distributed from the already-processed pixels.

6. A method as claimed in claim 5, wherein the modified density calculating step (b) includes the step of retrieving, from the error buffer prepared for the subject pixel, accumulated fractions of the conversion errors distributed from the already-converted pixels neighboring to the subject pixel.

7. A method as claimed in claim 4, wherein the modified density calculating step (b) includes the step of determining, at a predetermined weighting manner, a sum of the fractions of the conversion errors to be distributed to the subject pixel from the already-processed pixels neighboring to the subject pixel.

8. A method as claimed in claim 7, wherein the error-distributing binary conversion step further includes the step of storing the conversion error calculated for the subject pixel in an error buffer for the subject pixel.

9. A method as claimed in claim 4, wherein the non-uniform numerical value pattern includes a plurality of numerical values arranged in the main scanning direction for causing the conversion error modification step (f) to produce conversion errors not to induce undesirable textures on the pseudo-halftone image.

10. A method as claimed in claim 9, further comprising the step of producing the non-uniform numerical value pattern, the production step including the steps of:
  (1) preparing a non-uniform numerical value pattern candidate;
  (2) converting a uniform density continuous tone image, which has a plurality of pixels with a single uniform density other than the maximum and minimum densities, into a pseudo-halftone image through repeating the steps (a) through (f) for all the pixels within the uniform density continuous tone image, the step (f) using the non-uniform numerical value pattern candidate;
  (3) judging whether or not the pseudo-halftone image is in a predetermined state; and
  (4) determining the non-uniform numerical value pattern candidate as the non-uniform numerical value pattern when the pseudo-halftone image is in the predetermined state.

11. A method as claimed in claim 10, wherein the production step further includes the step of repeating, when the pseudo-halftone image is not in the predetermined state, the steps of (1) through (3) while modifying the step (1) to change the non-uniform numerical value pattern candidate until the step (3) judges that the pseudo-halftone image becomes the predetermined state.

12. A method as claimed in claim 11,
  wherein the step (2) converts a plurality of uniform density continuous tone images, each of which has a plurality of pixels with a corresponding single uniform density defined higher than the minimum density and lower than the maximum density, into pseudo-halftone images through repeating the steps (a) through (f) for all the pixels within each continuous tone image, the step (f) using the non-uniform numerical value pattern candidate prepared in the step (1),
  wherein the judging step (3) judges whether or not all the produced pseudo-halftone images are in the predetermined state, and
  wherein the determining step (4) determines the non-uniform numerical value pattern candidate as the non-uniform numerical value pattern when all the pseudo-halftone images are in the predetermined state.

13. A method as claimed in claim 9, wherein the non-uniform numerical value pattern includes a binary conversion error pattern produced along the main scanning direction when a uniform density continuous tone image, whose all the pixels have a single density other than the minimum density and the maximum density, is subjected to an error-distributing binary conversion process to be converted into a pseudo-halftone image.

14. A method as claimed in claim 13, further comprising the step of producing the non-uniform numerical value pattern, the production step including the steps of:
  (i) calculating a modified density for a subject pixel in the uniform density continuous tone image through adding the density of the subject pixel with fractional portions of errors distributed from the already-processed pixels neighboring to the subject pixel;
  (ii) comparing the modified density with a predetermined threshold value, and converting the subject pixel into the first binary value when the modified density is smaller than the threshold value, and converting the subject pixel into the second binary value when the modified density is equal to or greater than the threshold value;
  (iii) calculating a conversion error to be distributed from the subject pixel to pixels neighboring to the subject pixel, the conversion error being calculated as equal to the modified density when the subject pixel is converted into the first binary value, the conversion error being calculated as equal to a value obtained through subtracting the maximum density from the modified density when the subject pixel is converted into the second binary value; and
  (iv) accumulating at least a fractional portion of the conversion error in an error buffer at at least a position corresponding to the subject pixel; and
  (v) repeating the steps (i) through (iv) for all the pixels within the continuous tone image, thereby producing the pseudo-halftone image and producing the non-uniform numerical value pattern in the error buffer.

15. A method as claimed in claim 14, wherein the accumulating step (iv) includes the steps of:
  distributing fractions of the calculated conversion error to unprocessed neighboring pixels according to a predetermined weighting manner; and
  accumulating, in the error buffer prepared for a position corresponding to each of the unprocessed neighboring pixels, the corresponding fraction of the calculated conversion error with already-accumulated fractions of conversion errors distributed from the already-processed pixels.

16. A method as claimed in claim 15, wherein the modified density calculating step (i) includes the step of retrieving, from the error buffer prepared for the subject pixel, accumulated fractions of the conversion errors distributed from the already-converted pixels neighboring to the subject pixel.

17. A method as claimed in claim 14, wherein the accumulating step (iv) includes the step of storing the conversion error calculated for the subject pixel in the error buffer at a position corresponding to the subject pixel.

18. A method as claimed in claim 17, wherein the modified density calculating step (i) includes the step of determining, at a predetermined weighting manner, a sum of the fractions of the conversion errors to be distributed to the subject pixel from the already-processed pixels neighboring to the subject pixel.

19. A method as claimed in claim 14, wherein the production step further includes the steps of:
  causing an operator to visually observe the pseudo-continuous tone image obtained in step (v) and to select, from the continuous tone image, a region in a predetermined state; and
  storing, as the non-uniform numerical value pattern, the conversion errors accumulated in the error buffer in correspondence with pixels located in the selected region.

20. A method as claimed in claim 13, wherein all the pixels in the uniform density continuous tone image have the single density defined between a value of (minimum density+1) and another value of ((maximum density+1)/4).

21. A method as claimed in claim 9, wherein the non-uniform numerical value pattern includes a plurality of random numbers arranged in the main scanning direction.

22. A method as claimed in claim 9, wherein the non-uniform numerical value pattern includes a plurality of numerical values which are equal to or smaller than the threshold value.

23. A method as claimed in claim 9, wherein the conversion error modification step (f) includes the steps of:

comparing the conversion error, calculated for the subject pixel, with the numerical value located in the corresponding position in the non-uniform numerical value pattern; and modifying the conversion error with using a predetermined correction value based on the compared result.

24. A method as claimed in claim 23, wherein the modifying step includes the step of increasing the binary conversion error with the predetermined correction value when the binary conversion error is lower than the numerical value or decreasing the binary conversion error with the predetermined correction value when the binary conversion error is greater than the numerical value.

25. A method as claimed in claim 24, wherein the increasing/decreasing step increases the binary conversion error through adding the predetermined correction value to the binary conversion error and decreases the binary conversion error through subtracting the predetermined correction value from the binary conversion error.

26. A method as claimed in claim 25, wherein the predetermined correction value has a value in a range of 2% to 25% of the maximum density.

27. A method as claimed in claim 9, wherein the conversion error modification step (f) includes the steps of:

comparing the conversion error, calculated for the subject pixel, with the numerical value located in the corresponding position in the non-uniform numerical value pattern;

adjusting a correction value according to an original density state of a pixel neighboring to the subject pixel; and modifying the conversion error with using the adjusted correction value based on the compared result.

28. A method as claimed in claim 23, wherein the conversion error modification step (f) further includes the step of modifying the numerical value in the non-uniform numerical value pattern at the subject pixel-corresponding position based on amounts, by which binary conversion errors have been modified at a predetermined number of successive pixels, which are located in the same main scanning line with the subject pixel and which have been subjected to the error-distributing image conversion processes of (a)–(f) immediately before the subject pixel, the comparing step comparing, with the modified numerical value, the conversion error calculated for the subject pixel.

29. A method as claimed in claim 9, wherein the binary conversion errors, obtained at pixels successively arranged along the main scanning direction, are gradually changed to approach the numerical values at the corresponding positions in the non-uniform numerical value pattern.

30. A method as claimed in claim 29, wherein the binary conversion errors obtained along the main scanning direction are gradually changed into the non-uniform numerical value pattern through increasing the binary conversion error obtained at the subject pixel when the binary conversion error is smaller than the numerical value in the non-uniform numerical value pattern at a corresponding position and through decreasing the binary conversion error obtained at the subject pixel when the binary conversion error is greater than the numerical value in the non-uniform numerical value pattern at the corresponding position.

31. A method as claimed in claim 30, wherein the binary conversion error is increased through adding the predetermined correction value to the binary conversion error, and the binary conversion error is decreased through subtracting the predetermined correction value from the binary conversion error, the predetermined correction value having a value in a range of 2% to 25% of the maximum density.

32. A method as claimed in claim 30, wherein the binary conversion error is increased or decreased through multiplying or dividing the binary conversion error with the predetermined correction value.

33. A method as claimed in claim 29, wherein the binary conversion error pattern along the main scanning direction is changed into the non-uniform numerical value pattern while maintaining an average value of the binary conversion error pattern.

34. A method as claimed in claim 29, wherein the binary conversion error pattern along the main scanning direction is changed into the non-uniform numerical value pattern while maintaining a total value of the binary conversion error pattern.

35. A method as claimed in claim 30, wherein the binary conversion error pattern along the main scanning direction is gradually changed into the non-uniform numerical value pattern through controlling the number of pixels, at which the conversion error increasing process is attained, to be equal to the number of pixels, at which the conversion error decreasing process is attained.

36. A method as claimed in claim 1, wherein the minimum density is equal to zero (0), and the maximum density is equal to 255.

37. A conversion device for converting a continuous tone image into a pseudo-halftone image, the device comprising:

means for receiving data of a continuous tone image desired to be converted into a pseudo-halftone image, the continuous tone image having a plurality of pixels, each pixel having one density value defined in a range between a predetermined minimum density and a predetermined maximum density; and means for subjecting all the pixels of the continuous tone image to an error-distributing binary conversion process on a pixel by pixel basis along a main scanning direction, to thereby convert the density values of the pixels into binary values while calculating conversion errors and distributing the calculated conversion errors to neighboring pixels, while performing at least one of a first converting process and a second converting process, the first converting process being for compulsively converting a minimum density pixel that has the minimum density into a first binary value and adjusting a binary conversion error produced for the minimum density pixel into a non-uniform error value, the second converting process being for compulsively converting a maximum density pixel that has the maximum density into a second binary value and adjusting a binary conversion error produced for the maximum density pixel into another non-uniform error value.

38. A device as claimed in claim 37, wherein the conversion means includes:

means for storing a non-uniform numerical value pattern; and means for converting the density values of the pixels into binary values while calculating conversion errors and distributing the calculated conversion errors to neighboring pixels, while performing at least one of the first converting process and the second converting process, the first converting process adjusting the conversion error in correspondence with a numerical value, in the non-uniform numerical value pattern, set for a position of the minimum density pixel along the main scanning direction, and the second converting process adjusting the binary conversion error in correspondence with another numerical value, in the non-uniform numerical value pattern, set for a position of the maximum density pixel along the main scanning direction.

39. A device as claimed in claim 38, wherein the converting means includes:

means for judging whether or not the subject pixel density is equal to the minimum density, the maximum density, or not;

means for, when the subject pixel density is equal to either the minimum density or the maximum density, comparing the binary conversion error, produced at the subject pixel, with a numerical value in the non-uniform numerical value pattern at a corresponding position; and means for modifying the binary conversion error in correspondence with the non-uniform numerical value pattern in accordance with the compared result.

40. A device as claimed in claim 39, wherein the non-uniform numerical value pattern includes a plurality of numerical values arranged in the main scanning direction for causing the conversion error modification means to produce conversion errors not to induce undesirable textures on the pseudo-halftone image.

41. A device as claimed in claim 40, wherein the non-uniform numerical value pattern includes a binary conversion error pattern produced along the main scanning direction when a uniform density continuous tone image, whose all the pixels have a single density other than the minimum density and the maximum density, is subjected to an error-distributing binary conversion process to be converted into a pseudo-halftone image.

42. A device as claimed in claim 39, wherein the modifying means includes:

means for increasing the binary conversion error with a predetermined correction value when the binary conversion error is lower than the numerical value; and means for decreasing the binary conversion error with the predetermined correction value when the binary conversion error is greater than the numerical value.

43. A device as claimed in claim 39, wherein the converting means further includes means for modifying the numerical value in the non-uniform numerical value pattern at the subject pixel-corresponding position based on amounts, by which binary conversion errors have been modified at a predetermined number of successive pixels, which are located in the same main scanning line with the subject pixel and which have been subjected to the error-distributing image conversion processes immediately before the subject pixel, the comparing means comparing, with the modified numerical value, the conversion error calculated for the subject pixel.

44. A program data storage medium for storing data of a program for converting a continuous tone image into a pseudo-halftone image, the program comprising the programs of:

receiving data of a continuous tone image desired to be converted into a pseudo-halftone image, the continuous tone image having a plurality of pixels, each pixel having one density value defined in a range between a predetermined minimum density and a predetermined maximum density; and subjecting all the pixels of the continuous tone image to an error-distributing binary conversion process on a pixel by pixel basis along a main scanning direction, to thereby convert the density values of the pixels into binary values while calculating binary conversion errors and distributing the calculated binary conversion errors to neighboring pixels, while performing at least one of a first converting process and a second converting process, the first converting process being for compulsively converting a minimum density pixel that has the minimum density into a first binary value and adjusting a binary conversion error produced for the minimum density pixel into a non-uniform error value, the second converting process being for compulsively converting a maximum density pixel that has the maximum density into a second binary value and adjusting a binary conversion error produced for the maximum density pixel into another non-uniform error value.

* * * * *